US008363567B2

(12) United States Patent
Kent et al.

(10) Patent No.: US 8,363,567 B2
(45) Date of Patent: *Jan. 29, 2013

(54) METHOD AND SYSTEM FOR CHANNEL ESTIMATION IN A SINGLE CHANNEL (SC) MULTIPLE-INPUT MULTIPLE-OUTPUT (MIMO) SYSTEM COMPRISING TWO-TRANSMIT (2-TX) AND MULTIPLE-RECEIVE (M-RX) ANTENNAS FOR WCDMA/HSDPA

(75) Inventors: Mark Kent, Vista, CA (US); Vinko Erceg, Cardiff, CA (US); Uri M Landau, San Diego, CA (US); Pieter G. W. van Rooyen, San Diego, CA (US); Pieter Roux, San Diego, CA (US)

(73) Assignee: Broadcom Corporation, Irvine, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/022,841

(22) Filed: Feb. 8, 2011

(65) Prior Publication Data

US 2011/0128878 A1    Jun. 2, 2011

Related U.S. Application Data

(63) Continuation of application No. 12/343,955, filed on Dec. 24, 2008, now Pat. No. 7,885,288, and a continuation of application No. 11/173,252, filed on Jun. 30, 2005, now Pat. No. 7,471,694.

(60) Provisional application No. 60/616,297, filed on Oct. 6, 2004.

(51) Int. Cl.
  *H04W 24/00*    (2009.01)
(52) U.S. Cl. ........................ 370/252; 375/350
(58) Field of Classification Search .................. 370/210, 370/464, 310, 342; 375/350; 455/68
See application file for complete search history.

(56) References Cited

U.S. PATENT DOCUMENTS 6,128,276 A    10/2000    Agee

| 2003/0026199 | A1  | 2/2003  | Myers |
| 2003/0031234 | A1  | 2/2003  | Smee et al. |
| 2004/0131012 | A1* | 7/2004  | Mody et al. ................. 370/210 |
| 2004/0252667 | A1  | 12/2004 | Dent |
| 2005/0243898 | A1  | 11/2005 | Reznik et al. |
| 2007/0015545 | A1  | 1/2007  | Leifer et al. |

OTHER PUBLICATIONS

Jan Mietzner and Peter A. Hoeher, University of Kiel, Adaptive Antennas and MIMO Systems for Wireless Communications, Boosting the Performance of Wireless Communication Systems: Theory and Practice of Multiple-Antenna Techniques, IEEE Communications Magazine, Oct. 2004, pp. 40-47.

Simon Haykin, McMaster University; Mathini Sellathurai, Yvo de Jong, and Tricia Willink, Communications Research Centre Canada, Adaptive Antennas and MIMO Systems for Wireless Communications, Turbo-MIMO for Wireless Communications, IEEE Communications Magazine, Oct. 2004, pp. 48-53.

(Continued)

*Primary Examiner* — Phuoc Doan
(74) *Attorney, Agent, or Firm* — Sterne, Kessler, Goldstein & Fox P.L.L.C.

(57) ABSTRACT

In a wireless system, a method and system for channel estimation in a single channel MIMO system comprising two-transmit and multiple-receive antennas for WCDMA/HSDPA are provided. A first receive antenna and at least one additional receive antenna may receive a plurality of SC communication signals transmitted from a first and an additional transmit antennas. Estimates of the propagation channels between transmit and receive antennas may be performed concurrently and may be determined from a baseband combined channel estimate. The integration time may be based on channel estimation accuracy and wireless modem performance. The signals received in the additional receive antennas may be multiplied by a rotation waveform to achieve channel orthogonality. The rotation waveform's amplitude and phase components may be modified based on the channel estimates. Rotation of the received signals in the additional receive antennas may be continuous or periodic.

27 Claims, 14 Drawing Sheets

OTHER PUBLICATIONS

David J. Love, Purdue University, Robert W. Heath Jr., University of Texas at Austin and Wiroonsak Santipach and Michael L. Honig, Northwestern University; Adaptive Antennas and MIMO Systems for Wireless Communications, What is the Value of Limited Feedback for MIMO Channels?, IEEE Communications Magazine, Oct. 2004, pp. 54-59.

Quentin H. Spencer, Distribution Control Systems, Inc., Christian B. Peel, Swiss Federal Institute of Technology, A. Lee Swindlehurst, Brigham Young University, Martin Haardt, Ilmenau University of Technology, Adaptive Antennas and MIMO Systems for Wireless Communications, An Introduction to the Multi-User MIMO Downlink, IEEE Communications Magazine, Oct. 2004, pp. 60-67.

Shahab Sanayei and Aria Nosratinia, University of Texas at Dallas, Adaptive Antennas and MIMO Systems for Wireless Communications, Antenna Selection in MIMO Systems, IEEE Communications Magazine, Oct. 2004, pp. 68-73.

Aria Nosratinia, University of Texas, Dallas, Todd E. Hunter, Nortel Networks, Ahmadreza Hedayat, University of Texas, Dallas, Cooperative Communication in Wireless Networks, IEEE Communications Magazine, Oct. 2004, pp. 74-80.

Jack H. Winters, Optimum Combining for Indoor Radio Systems with Multiple Users, IEEE Communications Magazine, vol. COM-35, No. 11, Nov. 1987, pp. 1222-1230.

3rd Generation Partnership Project; Technical Specification Group Radio Access Network; Physical Layer Procedures (FDD) (Release 6), 3GPP TS 25.214 V62.0 (Jun. 2004), pp. 1-64.

* cited by examiner

METHOD AND SYSTEM FOR CHANNEL ESTIMATION IN A SINGLE CHANNEL (SC) MULTIPLE-INPUT MULTIPLE-OUTPUT (MIMO) SYSTEM COMPRISING TWO-TRANSMIT (2-TX) AND MULTIPLE-RECEIVE (M-RX) ANTENNAS FOR WCDMA/HSDPA

CROSS-REFERENCE TO RELATED APPLICATIONS/INCORPORATION BY REFERENCE

This patent application is a continuation of U.S. patent application Ser. No. 12/343,955 filed on Dec. 24, 2008, which application is a continuation of U.S. patent application Ser. No. 11/173,252 filed on Jun. 30, 2005, issued as U.S. Pat. No. 7,471,694 on Dec. 30, 2008, which makes reference to, claims priority to and claims benefit from U.S. Provisional Patent Application Ser. No. 60/616,297 filed on Oct. 6, 2004.

This application makes reference to:
U.S. patent application Ser. No. 11/173,870 filed Jun. 30, 2005;
U.S. patent application Ser. No. 11/174,303 filed Jun. 30, 2005, issued as U.S. Pat. No. 7,643,839 on Jan. 5, 2010;
U.S. patent application Ser. No. 11/173,502 filed Jun. 30, 2005;
U.S. patent application Ser. No. 11/173,871 filed Jun. 30, 2005;
U.S. patent application Ser. No. 11/173,964 filed Jun. 30, 2005, issued as U.S. Pat. No. 7,787,520 on Aug. 31, 2010;
U.S. patent application Ser. No. 11/174,252 filed Jun. 30, 2005;
U.S. patent application Ser. No. 11/172,756 filed Jun. 30, 2005, issued as U.S. Pat. No. 7,522,562 on Apr. 21, 2009;
U.S. patent application Ser. No. 11/173,305 filed Jun. 30, 2005;
U.S. patent application Ser. No. 11/172,759 filed Jun. 30, 2005, issued as U.S. Pat. No. 7,483,675 on Jan. 27, 2009;
U.S. patent application Ser. No. 11/173,689 filed Jun. 30, 2005;
U.S. patent application Ser. No. 11/173,304 filed Jun. 30, 2005;
U.S. patent application Ser. No. 11/173,129 filed Jun. 30, 2005;
U.S. patent application Ser. No. 11/172,779 filed Jun. 30, 2005, issued as U.S. Pat. No. 7,586,886 on Sep. 8, 2009;
U.S. patent application Ser. No. 11/172,702 filed Jun. 30, 2005, issued as U.S. Pat. No. 7,593,493 on Sep. 22, 2009;
U.S. patent application Ser. No. 11/173,727 filed Jun. 30, 2005;
U.S. patent application Ser. No. 11/173,726 filed Jun. 30, 2005;
U.S. patent application Ser. No. 11/172,781 filed Jun. 30, 2005;
U.S. patent application Ser. No. 11/174,067 filed Jun. 30, 2005;
U.S. patent application Ser. No. 11/173,854 filed Jun. 30, 2005;
U.S. patent application Ser. No. 11/173,911 filed Jun. 30, 2005; and
U.S. patent application Ser. No. 11/174,403 filed Jun. 30, 2005, issued as U.S. Pat. No. 7,505,539 on Mar. 17, 2009.

Each of above referenced applications is hereby incorporated herein by reference in its entirety.

FIELD OF THE INVENTION

Certain embodiments of the invention relate to the processing of wireless communication signals. More specifically, certain embodiments of the invention relate to a method and system for channel estimation in a single channel (SC) multiple-input-multiple-output (MIMO) system comprising two-transmit (2-Tx) and multiple-receive (M-Rx) antennas for WCDMA/HSDPA.

BACKGROUND OF THE INVENTION

Mobile communications has changed the way people communicate and mobile phones have been transformed from a luxury item to an essential part of every day life. The use of mobile phones is today dictated by social situations, rather than hampered by location or technology. While voice connections fulfill the basic need to communicate, and mobile voice connections continue to filter even further into the fabric of every day life, the mobile Internet is the next step in the mobile communication revolution. The mobile Internet is poised to become a common source of everyday information, and easy, versatile mobile access to this data will be taken for granted.

Third generation (3G) cellular networks have been specifically designed to fulfill these future demands of the mobile Internet. As these services grow in popularity and usage, factors such as cost efficient optimization of network capacity and quality of service (QoS) will become even more essential to cellular operators than it is today. These factors may be achieved with careful network planning and operation, improvements in transmission methods, and advances in receiver techniques. To this end, carriers need technologies that will allow them to increase downlink throughput and, in turn, offer advanced QoS capabilities and speeds that rival those delivered by cable modem and/or DSL service providers. In this regard, networks based on wideband CDMA (WCDMA) technology may make the delivery of data to end users a more feasible option for today's wireless carriers.

FIG. 1A is a technology timeline indicating evolution of existing WCDMA specification to provide increased downlink throughput. Referring to FIG. 1A, there is shown data rate spaces occupied by various wireless technologies, including General Packet Radio Service (GPRS) 100, Enhanced Data rates for GSM (Global System for Mobile communications) Evolution (EDGE) 102, Universal Mobile Telecommunications System (UMTS) 104, and High Speed Downlink Packet Access (HSDPA) 106.

The GPRS and EDGE technologies may be utilized for enhancing the data throughput of present second generation (2G) systems such as GSM. The GSM technology may support data rates of up to 14.4 kilobits per second (Kbps), while the GPRS technology, introduced in 2001, may support data rates of up to 115 Kbps by allowing up to 8 data time slots per time division multiple access (TDMA) frame. The GSM technology, by contrast, may allow one data time slot per TDMA frame. The EDGE technology, introduced in 2003, may support data rates of up to 384 Kbps. The EDGE technology may utilizes 8 phase shift keying (8-PSK) modulation for providing higher data rates than those that may be achieved by GPRS technology. The GPRS and EDGE technologies may be referred to as "2.5G" technologies.

The UMTS technology, introduced in 2003, with theoretical data rates as high as 2 Mbps, is an adaptation of the WCDMA 3G system by GSM. One reason for the high data rates that may be achieved by UMTS technology stems from the 5 MHz WCDMA channel bandwidths versus the 200 KHz GSM channel bandwidths. The HSDPA technology is an Internet protocol (IP) based service, oriented for data communications, which adapts WCDMA to support data transfer rates on the order of 10 megabits per second (Mbits/s). Developed by the 3G Partnership Project (3GPP) group, the HSDPA technology achieves higher data rates through a plurality of methods. For example, many transmission decisions may be made at the base station level, which is much closer to the user equipment as opposed to being made at a mobile switching center or office. These may include decisions about the scheduling of data to be transmitted, when data is to be retransmitted, and assessments about the quality of the transmission channel. The HSDPA technology may also utilize variable coding rates. The HSDPA technology may also support 16-level quadrature amplitude modulation (16-QAM) over a high-speed downlink shared channel (HS-DSCH), which permits a plurality of users to share an air interface channel In some instances, HSDPA may provide a two-fold improvement in network capacity as well as data speeds up to five times (over 10 Mbit/s) higher than those in even the most advanced 3G networks. HSDPA may also shorten the roundtrip time between network and terminal, while reducing variances in downlink transmission delay. These performance advances may translate directly into improved network performance and higher subscriber satisfaction. Since HSDPA is an extension of the GSM family, it also builds directly on the economies of scale offered by the world's most popular mobile technology. HSDPA may offer breakthrough advances in WCDMA network packet data capacity, enhanced spectral and radio access networks (RAN) hardware efficiencies, and streamlined network implementations. Those improvements may directly translate into lower cost-per-bit, faster and more available services, and a network that is positioned to compete more effectively in the data-centric markets of the future.

The capacity, quality and cost/performance advantages of HSDPA yield measurable benefits for network operators, and, in turn, their subscribers. For operators, this backwards-compatible upgrade to current WCDMA networks is a logical and cost-efficient next step in network evolution. When deployed, HSDPA may co-exist on the same carrier as the current WCDMA Release 99 services, allowing operators to introduce greater capacity and higher data speeds into existing WCDMA networks. Operators may leverage this solution to support a considerably higher number of high data rate users on a single radio carrier. HSDPA makes true mass-market mobile IP multimedia possible and will drive the consumption of data-heavy services while at the same time reducing the cost-per-bit of service delivery, thus boosting both revenue and bottom-line network profits. For data-hungry mobile subscribers, the performance advantages of HSDPA may translate into shorter service response times, less delay and faster perceived connections. Users may also download packet-data over HSDPA while conducting a simultaneous speech call.

HSDPA may provide a number of significant performance improvements when compared to previous or alternative technologies. For example, HSDPA extends the WCDMA bit rates up to 10 Mbps, achieving higher theoretical peak rates with higher-order modulation (16-QAM) and with adaptive coding and modulation schemes. The maximum QPSK bit rate is 5.3 Mbit/s and 10.7 Mbit/s with 16-QAM. Theoretical bit rates of up to 14.4 Mbit/s may be achieved with no channel coding. The terminal capability classes range from 900 kbit/s to 1.8 Mbit/s with QPSK modulation, and 3.6 Mbit/s and up with 16-QAM modulation. The highest capability class supports the maximum theoretical bit rate of 14.4 Mbit/s.

However, implementing advanced wireless technologies such as WCDMA and/or HSDPA may still require overcoming some architectural hurdles. For example, the RAKE receiver is the most commonly used receiver in CDMA systems, mainly due to its simplicity and reasonable performance and WCDMA Release 99 networks are designed so that RAKE receivers may be used. A RAKE receiver contains a bank of spreading sequence correlators, each receiving an individual multipath. A RAKE receiver operates on multiple discrete paths. The received multipath signals may be combined in several ways, from which maximum ratio combining (MRC) is preferred in a coherent receiver. However, a RAKE receiver may be suboptimal in many practical systems, for example, its performance may degrade from multiple access interference (MAI), that is, interference induced by other users in the network.

In the case of a WCDMA downlink, MAI may result from inter-cell and intracell interference. The signals from neighboring base stations compose intercell interference, which is characterized by scrambling codes, channels and angles of arrivals different from the desired base station signal. Spatial equalization may be utilized to suppress inter-cell interference. In a synchronous downlink application, employing orthogonal spreading codes, intra-cell interference may be caused by multipath propagation. Due to the non-zero cross-correlation between spreading sequences with arbitrary time shifts, there is interference between propagation paths (or RAKE fingers) after despreading, causing MAI. The level of intra-cell interference depends strongly on the channel response. In nearly flat fading channels, the physical channels remain almost completely orthogonal and intra-cell interference does not have any significant impact on the receiver performance. On the other hand, the performance of the RAKE receiver may be severely deteriorated by intra-cell interference in frequency selective channels. Frequency selectivity is common for the channels in WCDMA networks.

Due to the difficulties faced when non-linear channel equalizers are applied to the WCDMA downlink, detection of the desired physical channel with a non-linear equalizer may result in implementing an interference canceller or optimal multi-user receiver. Both types of receivers may be prohibitively complex for mobile terminals and may require information not readily available at the mobile terminal. Alternatively, the total base station signal may be considered as the desired signal. However, non-linear equalizers rely on prior knowledge of the constellation of the desired signal, and this information is not readily available at the WCDMA terminal. The constellation of the total base station signal, that is, sum of all physical channels, is a high order quadrature amplitude modulation (QAM) constellation with uneven spacing. The spacing of the constellation changes constantly due to transmission power control (TPC) and possible power offsets between the control data fields, time-multiplexed to the dedicated physical channels. The constellation order may also frequently change due to discontinuous transmission. This makes an accurate estimation of the constellation very difficult.

In this regard, the use of multiple transmit and/or receive antennas may result in an improved overall system performance. These multi-antenna configurations, also known as smart antenna techniques, may be utilized to mitigate the negative effects of multipath and/or signal interference on signal reception. It is anticipated that smart antenna techniques may be increasingly utilized both in connection with the deployment of base station infrastructure and mobile subscriber units in cellular systems to address the increasing capacity demands being placed on those systems. These demands arise, in part, from a shift underway from current voice-based services to next-generation wireless multimedia services that provide voice, video, and data communication.

The utilization of multiple transmit and/or receive antennas is designed to introduce a diversity gain and to suppress interference generated within the signal reception process. Such diversity gains improve system performance by increasing received signal-to-noise ratio, by providing more robustness against signal interference, and/or by permitting greater frequency reuse for higher capacity. In communication systems that incorporate multi-antenna receivers, a set of M receive antennas may be utilized to null the effect of (M−1) interferers, for example. Accordingly, N signals may be simultaneously transmitted in the same bandwidth using N transmit antennas, with the transmitted signal then being separated into N respective signals by way of a set of N antennas deployed at the receiver. Systems that utilize multiple transmit and receive antennas may be referred to as multiple-input multiple-output (MIMO) systems. One attractive aspect of multi-antenna systems, in particular MIMO systems, is the significant increase in system capacity that may be achieved by utilizing these transmission configurations. For a fixed overall transmitted power, the capacity offered by a MIMO configuration may scale with the increased signal-to-noise ratio (SNR). For example, in the case of fading multipath channels, a MIMO configuration may increase system capacity by nearly M additional bits/cycle for each 3-dB increase in SNR.

However, the widespread deployment of multi-antenna systems in wireless communications, particularly in wireless handset devices, has been limited by the increased cost that results from increased size, complexity, and power consumption. Providing separate RF chain for each transmit and receive antenna is a direct factor that increases the cost of multi-antenna systems. Each RF chain generally comprises a low noise amplifier (LNA), a filter, a downconverter, and an analog-to-digital converter (A/D). In certain existing single-antenna wireless receivers, the single required RF chain may account for over 30% of the receiver's total cost. It is therefore apparent that as the number of transmit and receive antennas increases, the system complexity, power consumption, and overall cost may increase. This poses problems for mobile system designs and applications.

Further limitations and disadvantages of conventional and traditional approaches will become apparent to one of skill in the art, through comparison of such systems with some aspects of the present invention as set forth in the remainder of the present application with reference to the drawings.

BRIEF SUMMARY OF THE INVENTION

A method and/or system for channel estimation in a single channel (SC) multiple-input-multiple-output (MIMO) system comprising two-transmit (2-Tx) and multiple-receive (M-Rx) antennas for WCDMA/HSDPA, substantially as shown in and/or described in connection with at least one of the figures, as set forth more completely in the claims.

These and other advantages, aspects and novel features of the present invention, as well as details of an illustrated embodiment thereof, will be more fully understood from the following description and drawings.

DETAILED DESCRIPTION OF THE INVENTION

Certain embodiments of the invention may be found in a method and system for channel estimation in a single channel (SC) multiple-input-multiple-output (MIMO) system comprising two-transmit (2-Tx) and multiple-receive (M-Rx) antennas for WCDMA/HSDPA. A first receive antenna and at least one additional receive antenna may receive a plurality of SC communication signals transmitted from a first and an additional transmit antennas. Estimates of the propagation channels between transmit and receive antennas may be performed concurrently and may be determined from a baseband combined channel estimate. The integration time may be based on channel estimation accuracy and wireless modem performance. The signals received in the additional receive antennas may be multiplied by a rotation waveform to achieve channel orthogonality. The rotation waveform's amplitude and phase components may be modified based on the channel estimates. Rotation of the received signals in the additional receive antennas may be continuous or periodic. The method and system described may provide a fast and cost effective approach to concurrently determine propagation channel estimates in a 2-Tx and M-Rx antennas wireless communication system for WCDMA/HSDPA. The channel estimation approach described herein may be applied to single weight antenna methods, for example.

Figure 1A:
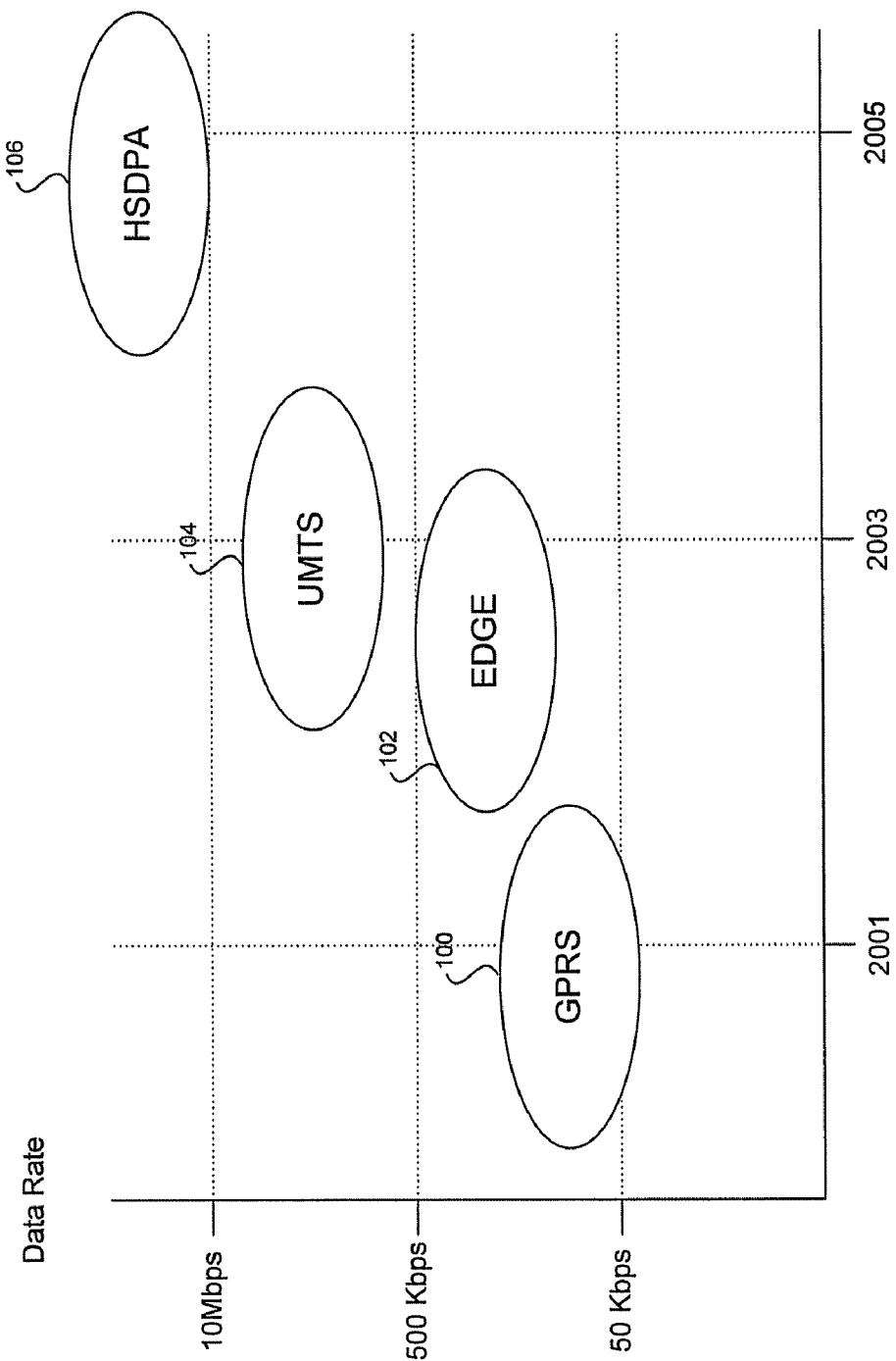
FIG. 1A is a technology timeline indicating evolution of existing WCDMA specification to provide increased downlink throughput.
Figure 1B:
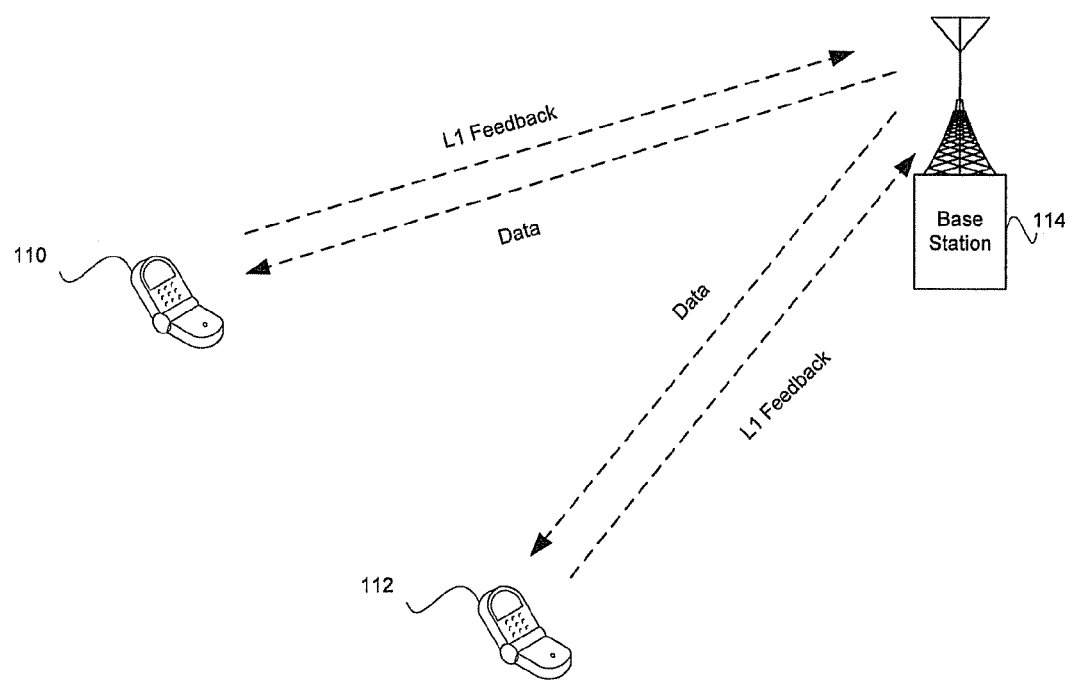
FIG. 1B illustrates an exemplary HSDPA distributed architecture that achieves low delay link adaptation, in connection with an embodiment of the invention.

FIG. 1B illustrates an exemplary HSDPA distributed architecture that achieves low delay link adaptation, in connection with an embodiment of the invention. Referring to FIG. 1B, there is shown terminals 110 and 112 and a base station (BS) 114. HSDPA is built on a distributed architecture that achieves low delay link adaptation by placing key processing at the BS 114 and thus closer to the air interface as illustrated. Accordingly, the MAC layer at the BS 114 is moved from Layer 2 to Layer 1, which implies that the systems may respond in a much faster manner with data access. Fast link adaptation methods, which are generally well established within existing GSM/EDGE standards, include fast physical layer (L1) retransmission combining and link adaptation techniques. These techniques may deliver significantly improved packet data throughput performance between the mobile terminals 110 and 112 and the BS 114.

The HSDPA technology employs several important new technological advances. Some of these may comprise scheduling for the downlink packet data operation at the BS 114, higher order modulation, adaptive modulation and coding, hybrid automatic repeat request (HARQ), physical layer feedback of the instantaneous channel condition, and a new transport channel type known as high-speed downlink shared channel (HS-DSCH) that allows several users to share the air interface channel. When deployed, HSDPA may co-exist on the same carrier as the current WCDMA and UMTS services, allowing operators to introduce greater capacity and higher data speeds into existing WCDMA networks. HSDPA replaces the basic features of WCDMA, such as variable spreading factor and fast power control, with adaptive modulation and coding, extensive multicode operation, and fast and spectrally efficient retransmission strategies.

In current-generation WCDMA networks, power control dynamics are on the order of 20 dB in the downlink and 70 dB in the uplink. WCDMA downlink power control dynamics are limited by potential interference between users on parallel code channels and by the nature of WCDMA base station implementations. For WCDMA users close to the base station, power control may not reduce power optimally, and reducing power beyond the 20 dB may therefore have only a marginal impact on capacity. HSDPA, for example, utilizes advanced link adaptation and adaptive modulation and coding (AMC) to ensure all users enjoy the highest possible data rate. AMC therefore adapts the modulation scheme and coding to the quality of the appropriate radio link.

Figure 1C:
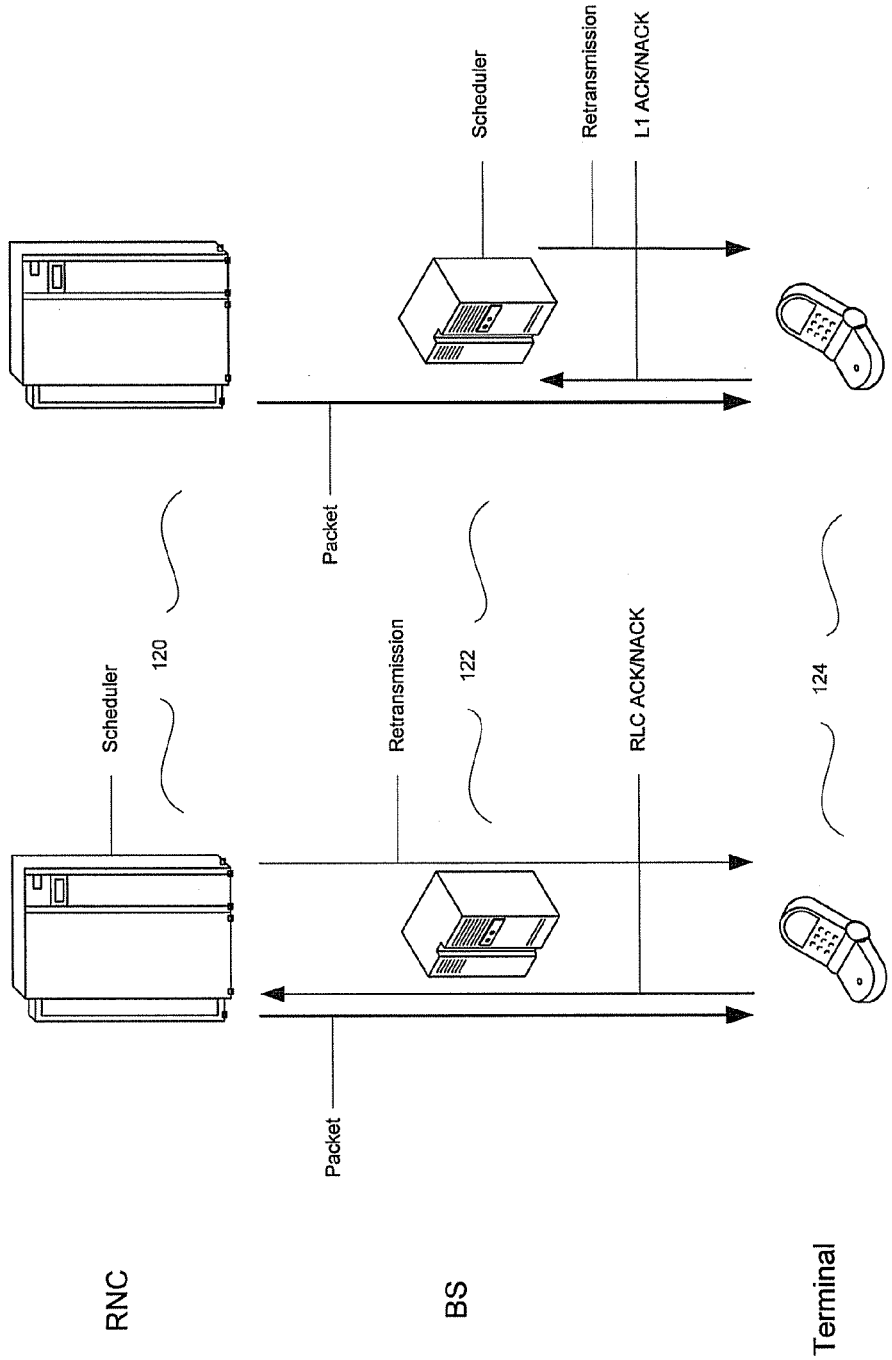
FIG. 1C illustrates an exemplary Layer 1 HARQ control situated in a base station to remove retransmission-related scheduling and storing from the radio network controller, in connection with an embodiment of the invention.

FIG. 1C illustrates an exemplary Layer 1 HARQ control situated in a base station to remove retransmission-related scheduling and storing from the radio network controller, in connection with an embodiment of the invention. Referring to FIG. 1C, there is shown a hybrid automatic repeat request (HARQ) operation, which is an operation designed to reduce the delay and increase the efficiency of retransmissions. Layer 1 HARQ control is situated in the Node B, or base station (BS), 122 thus removing retransmission-related scheduling and storing from the radio network controller (RNC) 120. This HARQ approach avoids hub delay and measurably reduces the resulting retransmission delay.

For example, when a link error occurs, due to signal interference or other causes, a mobile terminal 124 may request the retransmission of the data packets. While current-generation WCDMA networks handle those retransmission requests through the radio network controller 120, HSDPA retransmission requests are managed at the base station 122. Furthermore, received packets are combined at the physical (PHY) layer and retrieved only if successfully decoded. If decoding has failed, the new transmission is combined with the old transmission before channel decoding. The HSDPA approach allows previously transmitted frames (that failed to be decoded) to be combined with the retransmission. This combining strategy provides improved decoding efficiencies and diversity gains while minimizing the need for additional repeat requests.

While the spreading factor may be fixed, the coding rate may vary between 1/4 and 3/4, and the HSDPA specification supports the use of up to 10 multicodes. More robust coding, fast HARQ, and multi-code operation eliminates the need for variable spreading factor and also allows for more advanced receiver structures in the mobile such as equalizers as apposed to the traditional RAKE receiver used in most CDMA systems. This approach may also allow users having good signal quality or higher coding rates and those at the more distant edge of the cell having lower coding rates to each receive an optimum available data rate.

By moving data traffic scheduling to the base station 122, and thus closer to the air interface, and by using information about channel quality, terminal capabilities, QoS, and power/code availability, HSDPA may achieve more efficient scheduling of data packet transmissions. Moving these intelligent network operations to the base station 122 allows the system to take full advantage of short-term variations, and thus to speed and simplify the critical transmission scheduling process. The HSDPA approach may, for example, manage scheduling to track the fast fading of the users and when conditions are favorable to allocate most of the cell capacity to a single user for a very short period of time. At the base station 122, HSDPA gathers and utilizes estimates of the channel quality of each active user. This feedback provides current information on a wide range of channel physical layer conditions, including power control, ACK/NACK ratio, QoS, and HSDPA-specific user feedback.

While WCDMA Release 99 or WCDMA Release 4 may support a downlink channel (DCH) or a downlink shared channel (DSCH), the HSDPA operation provided by WCDMA Release 5 may be carried on a high-speed downlink shared channel (HS-DSCH). This higher-speed approach uses a 2-ms interval frame length (also known as time transmit interval), compared to DSCH frame lengths of 10, 20, 40 or 80 ms. DSCH utilizes a variable spreading factor of 4 to 256 chips while HS-DSCH may utilize a fixed spreading factor of 16 with a maximum of 15 codes. HS-DSCH may support 16-level quadrature amplitude modulation (16-QAM), link adaptation, and the combining of retransmissions at the physical layer with HARQ. HSDPA also leverages a high-speed shared control channel (HS-SCCH) to carry the required modulation and retransmission information. An uplink high-speed dedicated physical control channel (HS-DPCCH) carries ARQ acknowledgements, downlink quality feedback and other necessary control information on the uplink.

Figure 1D:
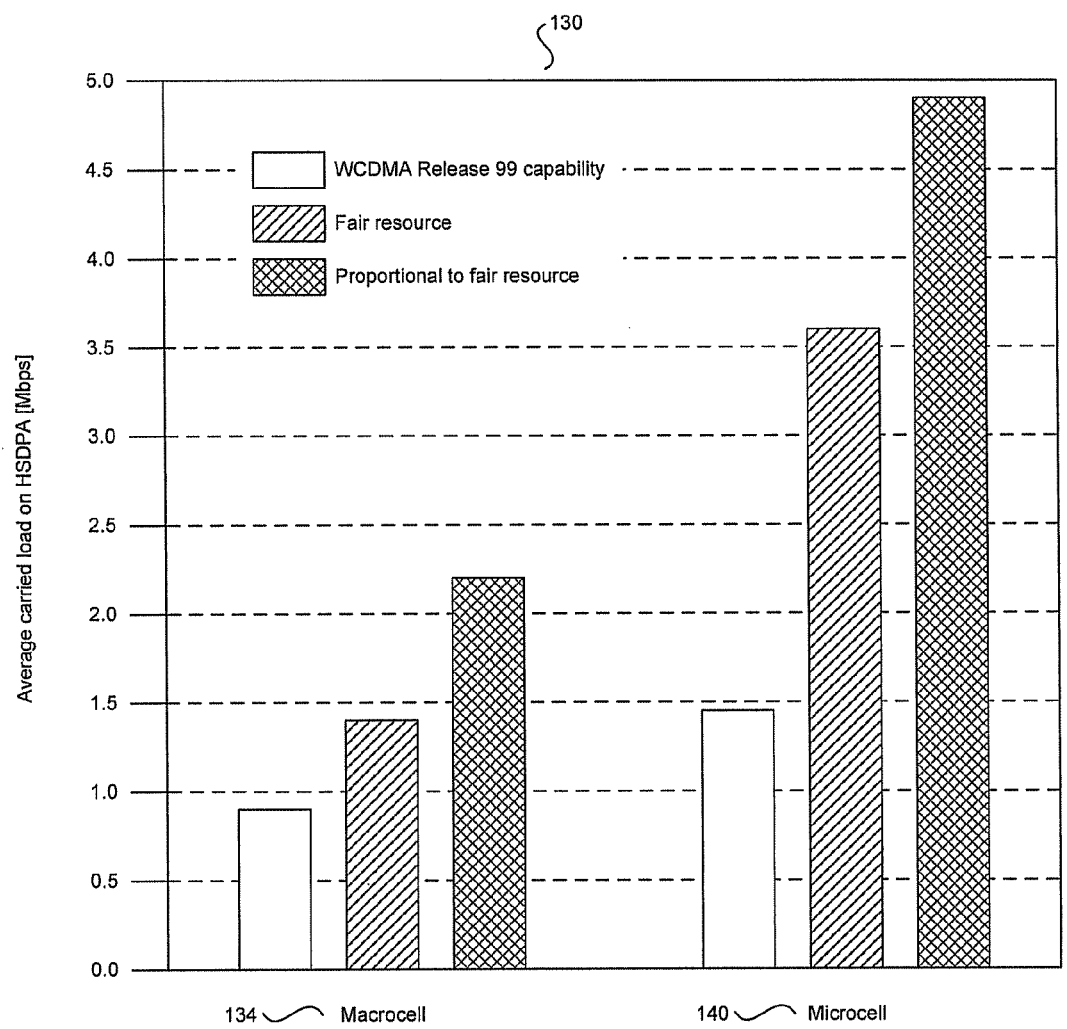
FIG. 1D is a chart illustrating exemplary average carried loads for HSDPA-based macrocell and microcell systems, in connection with an embodiment of the invention.

FIG. 1D is a chart illustrating exemplary average carried loads for HSDPA-based macrocell and microcell systems, in connection with an embodiment of the invention. Referring to the chart 130 in FIG. 1D, in practical deployments, HSDPA more than doubles the achievable peak user bit rates compared to WCDMA Release 99. With bit rates that are comparable to DSL modem rates, HS-DSCH may deliver user bit rates 134 in large macrocell environments exceeding 1 Mbit/s, and rates 140 in small microcells up to 5 Mbit/s. The HSDPA approach supports both non-real-time UMTS QoS classes and real-time UMTS QoS classes with guaranteed bit rates.

Cell throughput, defined as the total number of bits per second transmitted to users through a single cell, increases 100% with HSDPA when compared to the WCDMA Release 99. This is because HSDPA's use of HARQ combines packet retransmission with the earlier transmission, and thus no transmissions are wasted. Higher order modulation schemes, such as 16-QAM, enable higher bit rates than QPSK-only modulation in WCDMA Release 99, even when the same orthogonal codes are used in both systems. The highest throughput may be obtained with low inter-path interference and low inter-cell interference conditions. In microcell designs, for example, the HS-DSCH may support up to 5 Mbit/s per sector per carrier, or 1 bit/s/Hz/cell.

Figure 2A:
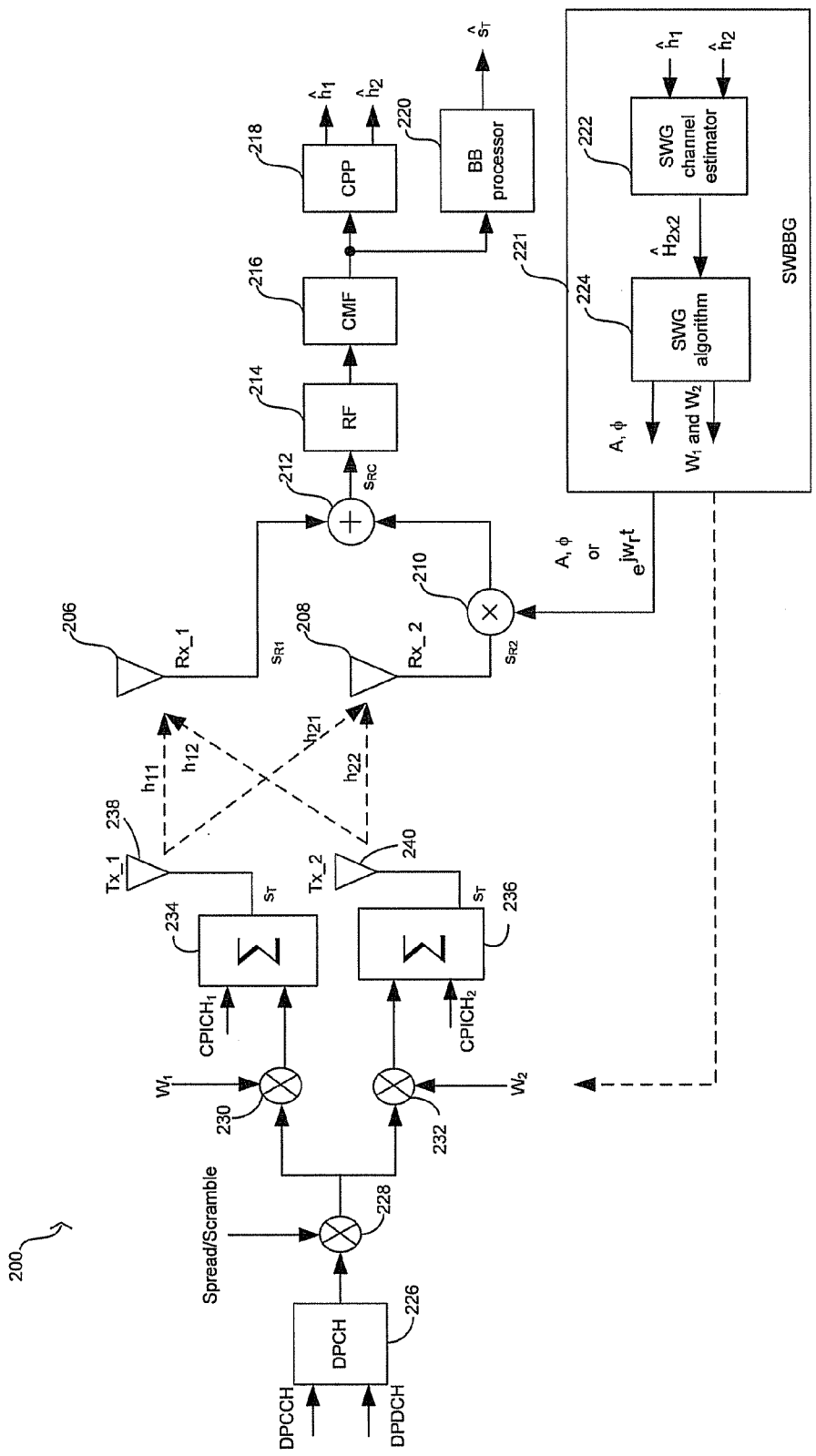
FIG. 2A is a block diagram of an exemplary two-transmit (2-Tx) and two-receive (2-Rx) antennas wireless communication system with receiver channel estimation, in accordance with an embodiment of the invention.

FIG. 2A is a block diagram of an exemplary two-transmit (2-Tx) and two-receive (2-Rx) antennas wireless communication system with receiver channel estimation, in accordance with an embodiment of the invention. Referring to FIG. 2A, the wireless communication system 200 may comprise a dedicated physical channel (DPCH) block 226, a plurality of mixers 228, 230 and 232, a first combiner 234, a second combiner 236, a first transmit antenna (Tx_1) 238, an additional transmit antenna (Tx_2) 240, a first receive antenna (Rx_1) 206, and an additional receive antenna (Rx_2) 208. The wireless communication system 200 may further comprise a mixer 210, an adder 212, an RF block 214, a chip matching filter (CMF) 216, a cluster path processor (CPP) 218, a baseband (BB) processor 220, a single weight baseband generator (SWBBG) 221, a single weight generator (SWG) channel estimator 222, and a SWG algorithm block 224.

The DPCH 226 may comprise suitable logic, circuitry, and/or code that may be adapted to receive a plurality of input channels, for example, a dedicated physical control channel (DPCCH) and a dedicated physical data channel (DPDCH). The DPCH 226 may be adapted to simultaneously control the power on each of the DPCCH and DPDCH channels. The mixer 228 may comprise suitable logic and/or circuitry that may be adapted to multiply the output of DPCH 226 with a spread and/or scramble signal to generate a spread complex-valued signal that may be transferred to the inputs of the mixers 230 and 232.

The mixers 230 and 232 may comprise suitable logic and/or circuitry that may be adapted to multiply the spread complex-valued signal from the mixer 228 by the closed loop 1 (CL1) and closed loop 2 (CL2) transmit diversity weight factors $W_1$ and $W_2$ respectively. Closed loop transmit diversity may be described in the $3^{rd}$ Generation Project Partnership (3GPP), Technical Specification Group Radio Access Network, Physical Layer Procedures (FDD), Release 6 (3GPP TS 25.214 V5.5.0, 2003-06). For example, the weight factors $W_1$ and $W_2$ may correspond to phase and/or amplitude component feedback adjustments that may be generated by the receiver based on the type of space-time coding that is used. This approach may correspond to, for example, closed loop transmit diversity as currently being used in WCDMA. In this regard, a closed loop processing block may be utilized to transfer the weight factors or parameters that correspond to those weight factors to the transmitter via an uplink feedback process.

The output of the mixer 230 may be transferred to the first combiner 234 and the output of the mixer 232 may be transferred to the second combiner 236. The first and second combiners 234 and 236 may comprise suitable logic, circuitry, and/or code that may be adapted to add or combine the outputs generated by mixers 230 and 232 with a common pilot channel 1 (CPICH1) signal and a common pilot channel 2 (CPICH2) signal respectively. The CPICH1 signal and CPICH2 signals may comprise fixed channelization code allocation and may be utilized to measure the signal phase and amplitude and strength of the propagation channels between the transmit antennas and the receive antennas.

The first transmit antenna, Tx_1 238, and the additional or second transmit antenna, Tx_2 240, may comprise suitable hardware that may be adapted to transmit a plurality of SC communication signals, $s_T$, from a wireless transmitter device. The first receive antenna, Rx_1 206, and the additional or second receive antenna, Rx_2 208, may comprise suitable hardware that may be adapted to receive at least a portion of the transmitted SC communication signals in a wireless receiver device. For example, the receive antenna Rx_1 206 may receive signal $s_{R1}$ while the receive antenna Rx_2 208 may receive signal $s_{R2}$. The propagation channels that corresponds to the paths taken by the SC communication signals transmitted from the transmit antennas Tx_1 238 and Tx_2 240 and received by the receive antenna Rx_1 206 may be represented by $h_{11}$ and $h_{12}$ respectively. In this regard, $h_{11}$ and $h_{12}$ may represent the actual time varying impulse responses of the radio frequency (RF) paths taken by the SC communication signals transmitted from the transmit antennas Tx_1 238 and Tx_2 240 and received by the receive antenna Rx_1 206.

Similarly, the propagation channels that corresponds to the paths taken by the SC communication signals transmitted from the transmit antennas Tx_1 238 and Tx_2 240 and received by the receive antenna Rx_2 208 may be represented by $h_{21}$ and $h_{22}$ respectively. In this regard, $h_{21}$ and $h_{22}$ may represent the actual time varying impulse responses of the RF paths taken by the SC communication signals transmitted from the transmit antennas Tx_1 238 and Tx_2 240 and received by the receive antenna Rx_2 208. In some instances, a wireless transmitter device comprising a single transmit antenna may be adapted to periodically transmit calibration and/or pilot signal that may be utilized by a 2-Rx antennas wireless receiver device to determine estimates of $h_{11}$, $h_{12}$, $h_{21}$, and $h_{22}$. The 2-Tx and 2-Rx antennas wireless communication system 200 in FIG. 2A may represent a MIMO communication system whereby the diversity gain may be increased for the transmitted data.

The mixer 210 may comprise suitable logic and/or circuitry that may be adapted to operate as a complex multiplier that may modify the amplitude and/or phase of the portion of the SC communication signals received by the receive antenna Rx_2 208 via a rotation waveform $e^{jw_r t}$ provided by the SWBBG 121, where $w_r = 2\pi f_r$ and $f_r$ is the rotation frequency. In this regard, a channel weight comprising an amplitude component and phase component may be provided by the SWBBG 221 for modifying the signal received by the receive antenna Rx_2 208 to achieve channel orthogonality between the receive antenna Rx_1 206 and the receive antenna Rx_2 208. In some implementations, the mixer 210 may comprise an amplifier and a phase shifter, for example.

Through the achieved channel orthogonality, estimates of $h_{11}$, $h_{12}$, $h_{21}$, and $h_{22}$ may be determined by the SWG channel estimator 222 in the SWBBG 221. The $h_{11}$, $h_{12}$, $h_{21}$, and $h_{22}$ estimates may be utilized by the SWG algorithm block 224 to determine an optimum amplitude A and phase φ that modify signals received by the receive antenna Rx_2 208 via mixer 210 so that the receiver signal-to-interference-and-noise ratio (SINR) is maximized. In some instances, instead of utilizing the rotation waveform $e^{jw_r t}$ to achieve the channel orthogonality between the receive antenna Rx_1 106 and the receive antenna Rx_2 108, square or triangular waveforms may be also utilized. Moreover, waveforms representing different orthogonal codes may also be utilized, similar to the CDMA orthogonal codes with the same spreading.

In some instances, the output of the mixer 210 may be transferred to a bandpass filter, a low noise amplifier (LNA), and/or a phase shifter for further processing of the received signals. The adder 212 may comprise suitable hardware, logic, and/or circuitry that may be adapted to add the output of the receive antenna Rx_1 206 and the output of the mixer 210 to generate a combined received SC communication signal, $S_{RC}$. In some instances, bringing the output signals of the receive antenna Rx_1 206 and the mixer 210 together into a single electrical connection may provide the functionality of the adder 212. Notwithstanding, an output of the adder 212 may be transferred to the RF block 214 for further processing of the combined received SC communication signal, $S_{RC}$.

The RF block 214 may comprise suitable logic and/or circuitry that may be adapted to process the combined received SC communication signal, $S_{RC}$. The RF block 214 may perform, for example, filtering, amplification, and/or analog-to-digital (A/D) conversion operations. The BB processor 220 may comprise suitable logic, circuitry, and/or code that may be adapted to determine a first baseband combined channel estimate, $\hat{h}_1$, which may comprise information regarding propagation channels $h_{11}$ and $h_{21}$. The BB processor 220 may also be adapted to process the output of the RF block 214 to determine a second baseband combined channel estimate, $\hat{h}_2$, which may comprise information regarding propagation channels $h_{12}$ and $h_{22}$. The BB processor 220 may also be adapted to determine an estimate of the transmitted SC communication signals, $\hat{s}_T$.

The CMF 216 may comprise suitable logic, circuitry, and/or code that may be adapted to operate as a matched-filter on the digital output from the RF block 214. The output of the CMF 216 may be transferred, for example, to the CPP 218 and/or to the BB processor 220 for further processing. The CPP 218 may comprise suitable logic, circuitry, and/or code that may be adapted to process the filtered output of the CMF 216 to determine a first baseband combined channel estimate, $\hat{h}_1$, which may comprise information regarding propagation channels $h_{11}$ and $h_{21}$. The CPP 218 may also be adapted to process the filtered output of the CMF 216 to determine a second baseband combined channel estimate, $\hat{h}_2$, which may comprise information regarding propagation channels $h_{12}$ and $h_{22}$. In this regard, the CPP 218 may process the received signals in clusters. U.S. application Ser. No. 11/173,854 provides a detailed description of signal clusters and is hereby incorporated herein by reference in its entirety. The CPP 218 may also be adapted to generate a lock indicator signal that may be utilized by, for example, the BB processor 220 as an indication of whether the channel estimates are valid. The BB processor 220 may comprise suitable logic, circuitry, and/or code that may be adapted to digitally process the filtered output of the CMF 216 to determine an estimate of the transmitted SC communication signals, $\hat{s}_T$.

The SWBBG 221 may comprise suitable logic, circuitry, and/or code that may be adapted to receive the first and second baseband combined channel estimates, $\hat{h}_1$ and $\hat{h}_2$, from the BB processor 220 and generate phase and amplitude components of the rotation waveform to be applied by the mixer 210 to modify the portion of the SC communication signals received by the receive antenna Rx_2 208, $s_{R2}$. The SWG channel estimator 222 may comprise suitable logic, circuitry, and/or code that may be adapted to process the first and second baseband combined channel estimates, $\hat{h}_1$ and $\hat{h}_2$, generated by the BB processor 220 and may determine a matrix $\hat{H}_{2\times 2}$ of propagation channel estimates $\hat{h}_{11}$, $\hat{h}_{12}$, $\hat{h}_{21}$, and $\hat{h}_{22}$, which correspond to estimates of a matrix $H_{2\times 2}$ of time varying impulse responses $h_{11}$, $h_{12}$, $h_{21}$, and $h_{22}$ respectively. The SWG algorithm block 224 may comprise suitable logic, circuitry, and/or code that may be adapted to determine a channel weight to be transferred to the mixer 210 to modify the signal $s_{R2}$ so that the receiver SINR is maximized. The channel weight to be transferred to the mixer 210 may refer to a phase, $\phi$, and amplitude, A, that results in a maximum SINR. Moreover, the SWG algorithm block 224 may be adapted to generate the weight factors $W_1$ and $W_2$ joint or concurrently with the channel weight for the mixer 210.

Figure 2B:
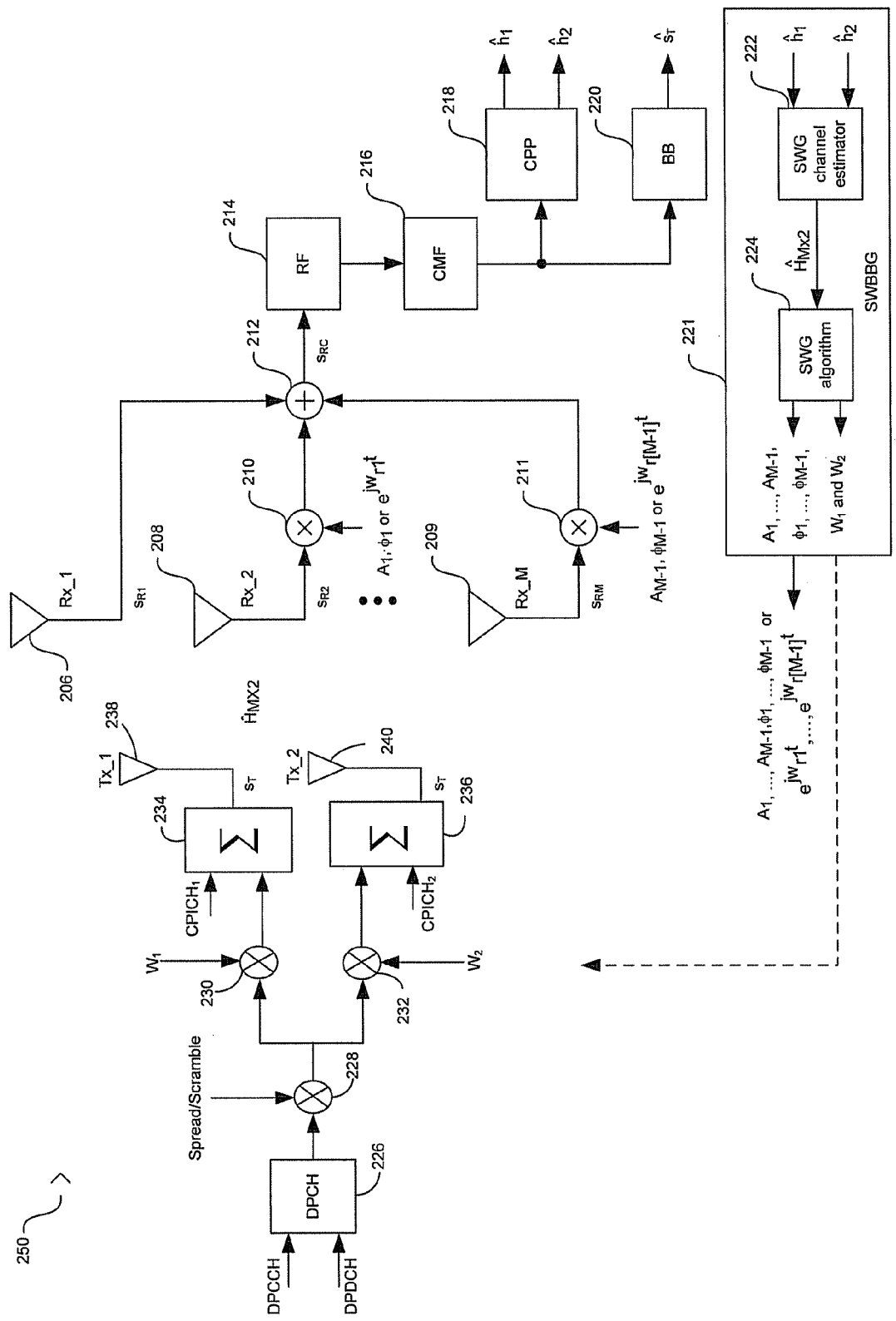
FIG. 2B is a block diagram of an exemplary two-transmit (2-Tx) and multiple-receive (M-Rx) antennas wireless communication system with receiver channel estimation, in accordance with an embodiment of the invention.

FIG. 2B is a block diagram of an exemplary two-transmit (2-Tx) and multiple-receive (M-Rx) antennas wireless communication system with receiver channel estimation, in accordance with an embodiment of the invention. Referring to FIG. 2B, the wireless communication system 250 may differ from the wireless communication system 200 in FIG. 2A in that (M−1) additional receive antennas Rx_2 208 to Rx_M 209, and (M−1) mixers 210 to 211 may be utilized, where M is the total number of receive antennas in the wireless receiver.

The propagation channels that correspond to the paths taken by the SC communication signals transmitted from the transmit antennas Tx_1 238 and Tx_2 240 and received by the receive antennas Rx_1 206 to Rx_M 209 may be represented by an M×2 matrix, $H_{M\times 2}$. The matrix $H_{M\times 2}$ may comprise propagation channels $h_{11}$ to $h_{M1}$ and $h_{12}$ to $h_{M2}$. In this regard, $h_{11}$ to $h_{M1}$ may represent the time varying impulse responses of the RF paths taken by the portion of the transmitted SC communication signals transmitted by transmit antenna Tx_1 238 and received by the receive antennas Rx_1 206 to Rx_M 209 respectively. Similarly, $h_{12}$ to $h_{M2}$ may represent the time varying impulse responses of the RF paths taken by the portion of the transmitted SC communication signals transmitted by transmit antenna Tx_2 240 and received by the receive antennas Rx_1 206 to Rx_M 209 respectively. In some instances, a wireless transmitter device comprising a first and a second transmit antenna may be adapted to periodically transmit calibration and/or pilot signals that may be utilized by an M-Rx antenna wireless receiver device to determine estimates of $h_{11}$ to $h_{M1}$ and $h_{12}$ to $h_{M2}$. The 2-Tx and M-Rx antennas wireless communication system 250 in FIG. 2B may represent a MIMO communication system whereby the diversity gain may be increased for the transmitted data.

The mixers 210 to 211 may comprise suitable logic and/or circuitry that may be adapted to operate as a complex multiplier that may modify the phase of the portion of the SC communication signals received by the receive antennas Rx_2 208 to Rx_M 209 via a rotation waveforms $e^{jw_{r1}t}$ to $e^{jw_{r(M-1)}t}$, where $w_{rk}=2\pi f_{rk}$ and $f_{rk}$ is the rotation frequency that preserves the orthogonality of the received signals at the multiple receiving antennas Rx_1 206 to Rx_M 209. The rotation frequency that preserves the signal orthogonality at the receiving antennas may be selected as $f_{rk}=kf_r$ where $k=1, 2, 3, \ldots, M-1$. Other rotation waveforms such as triangular or square waveforms may be utilized with the same frequency relationships. In addition, waveforms representing different orthogonal codes of the same frequency may be utilized, similar to the CDMA orthogonal codes with the same spreading. In this regard, the following exemplary sequences may be utilized: the first receive antenna Rx_1 206 may utilize the sequence [1 1 1 1], the second receive antenna Rx_2 208 may utilize the sequence [−1 −1 1 1], a third receive antenna (Rx_3) may utilize the sequence [−1 1 −1 1], and so on. In this embodiment, $e^{jw_{rk}t}$ is used as an exemplary waveform.

The channel weights comprising phase components for the rotation waveforms may be provided by the SWBBG 221 for modifying the signals received by the receive antennas Rx_2 208 to Rx_M 209 to achieve channel orthogonality between the receive antenna Rx_1 206 and the receive antennas Rx_2 208 to Rx_M 209. In some instances, the output of the mixers 210 to 211 may be transferred to a bandpass filter and/or a low noise amplifier (LNA) for further processing of the received signals. The adder 212 may comprise suitable hardware, logic, and/or circuitry that may be adapted to add the output of the receive antenna Rx_1 206 with the output of the mixers 210 to 211 to generate a combined received SC communication signal, $S_{RC}$, or gain balanced point. In some instances, bringing the output signals of the receive antenna Rx_1 206 and the mixers 210 to 211 together into a single electrical connection may provide the functionality of the adder 212. Notwithstanding, an output of the adder 212 may be transferred to the RF block 214 for further processing of the combined received SC communication signal, $s_{RC}$.

The CPP 218 in FIG. 2B may be adapted to determine a first baseband combined channel estimate, $\hat{h}_1$, which may comprise information regarding propagation channels $h_{11}$ to $h_{M1}$. For example, a portion of $\hat{h}_1$ may comprise information regarding the propagation channels between the transmit antenna Tx_1 238 and the receive antennas Rx_1 206 and Rx_2 208, that is, $h_{11}$ and $h_{21}$, while another portion of $\hat{h}_1$ may comprise information regarding the propagation channels between the transmit antenna Tx_1 238 and the receive antennas Rx_1 206 and Rx_M 209, that is, $h_{11}$ and $h_{M1}$. The actual time varying impulse responses $h_{11}$ to $h_{M1}$ may comprise multiple propagation paths arriving at different time delays.

The CPP 218 in FIG. 2B may also be adapted to determine a second baseband combined channel estimate, $\hat{h}_2$, which may comprise information regarding propagation channels $h_{12}$ to $h_{M2}$. For example, a portion of $\hat{h}_2$ may comprise information regarding the propagation channels between the transmit antenna Tx_2 240 and the receive antennas Rx_1 206 and Rx_2 208, that is, $h_{12}$ and $h_{22}$, while another portion of $\hat{h}_2$ may comprise information regarding the propagation channels between the transmit antenna Tx_2 240 and the receive antennas Rx_1 206 and Rx_M 209, that is, $h_{12}$ and $h_{M2}$. The actual time varying impulse responses $h_{12}$ to $h_{M2}$ may comprise multiple propagation paths arriving at different time delays. The combined channel estimates may be determined, that is, may be separated, in the CPP 218 utilizing the orthogonal relationship between the common pilot signals CPICH1 and CPICH2 that may be transmitted by the antennas Tx_1 238 and Tx_2 240, respectively.

The SWG channel estimator 222 in FIG. 2B may be adapted to process the first and second baseband combined channel estimates, $\hat{h}_1$ and $\hat{h}_2$, determined by the CPP 218 and may determine a matrix $\hat{H}_{M \times 2}$ of propagation channel estimates $\hat{h}_{11}$ to $\hat{h}_{M1}$ and $\hat{h}_{12}$ to $\hat{h}_{M2}$, which correspond to estimates of the matrix $H_{M \times 2}$ of time varying impulse responses $h_{11}$ to $h_{M1}$ and $h_{12}$ to $h_{M2}$, respectively. The SWG algorithm block 224 may utilize the contents of the matrix $\hat{H}_{M \times 2}$ to determine (M−1) channel weights to be applied to the mixers 210 to 211 to modify the portions of the transmitted SC communication signals received by the additional receive antennas Rx_2 208 to Rx_M 209 so that the receiver SINR is maximized, for example. The (M−1) channel weights may comprise amplitude and phase components, $A_1$ to $A_{M-1}$ and $\phi_1$ to $\phi_{M-1}$, for example. Moreover, the SWG algorithm block 224 may be adapted to generate the weight factors $W_1$ and $W_2$ joint or concurrently with the (M−1) channel weights.

Figure 3A:
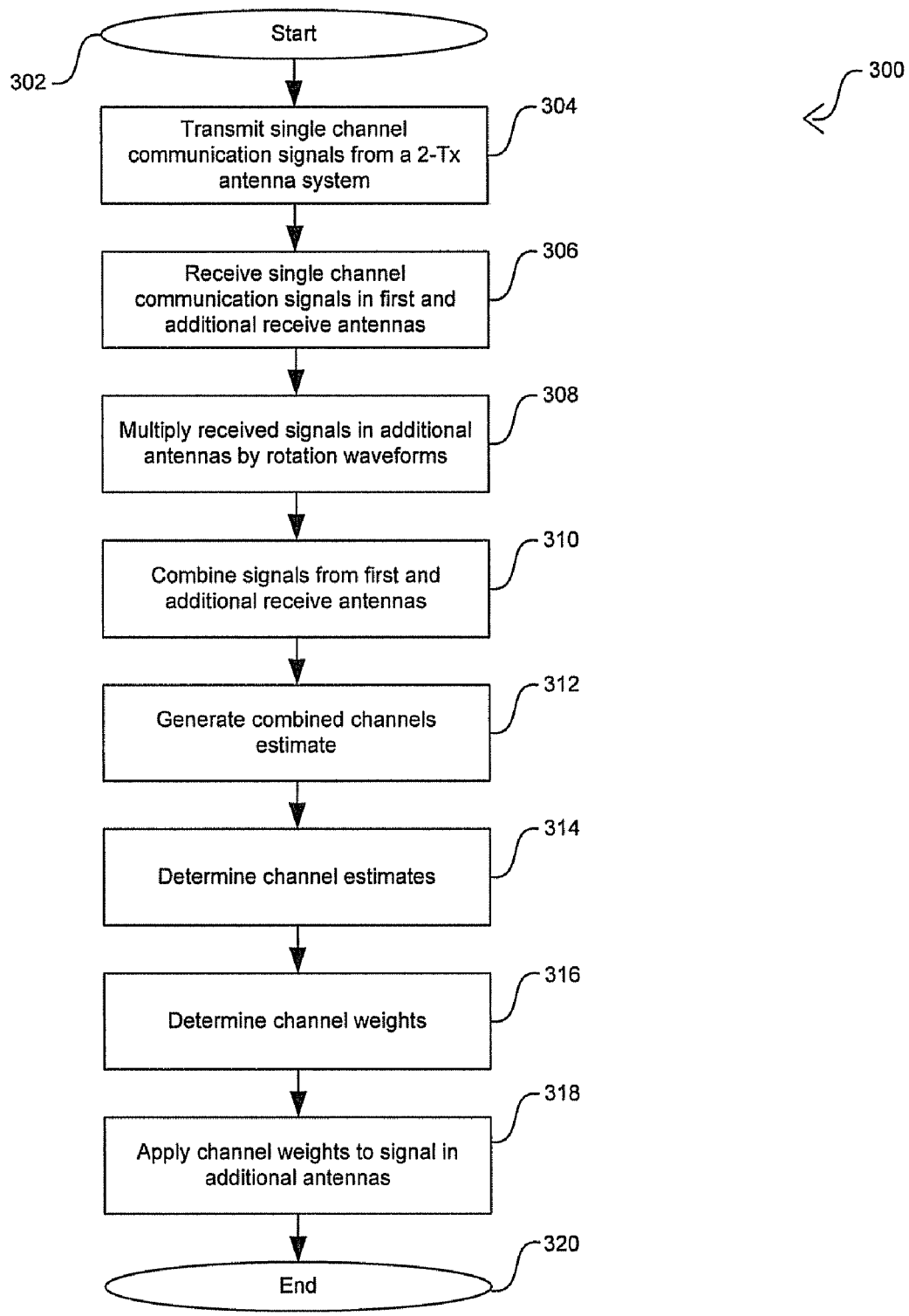
FIG. 3A is a flow diagram illustrating exemplary steps for channel estimation in a 2-Tx and M-Rx antennas wireless communication system, in accordance with an embodiment of the invention.

FIG. 3A is a flow diagram illustrating exemplary steps for channel estimation in a 2-Tx and M-Rx antennas wireless communication system, in accordance with an embodiment of the invention. Referring to FIG. 3A, after start step 302, in step 304, the SC communication signals, $s_T$, may be transmitted from the transmit antennas Tx_1 238 and Tx_2 240 in FIG. 2B. In step 306, the first and additional receive antennas, Rx_1 206 to Rx_M 209, may receive a portion of the transmitted SC communication signals. In step 308, the signals received by the additional receive antennas Rx_1 206 to Rx_M 209 may be multiplied by, for example, rotation waveforms, such as sine, square, or triangular waveforms for example, in the mixers 210 to 211 in FIG. 2B. In this regard, the rotation waveforms may have a given set of amplitude and phase component values. In step 310, the output of the receive antenna Rx_1 206 and the output of the mixers 210 to 211 associated with the additional receive antennas Rx_2 208 to Rx_M 209 may be added or combined into the received SC communication signal, $s_{RC}$. The combination may occur in the adder 212, for example.

In step 312, the CPP 218 may determine the first and second baseband combined channel estimates, $\hat{h}_1$ and $\hat{h}_2$, which comprise information regarding propagation channels $h_{11}$ to $h_{M1}$ and $h_{12}$ to $h_{M2}$. In step 314, the SWG channel estimator 222 in the SWBBG 221 may determine the matrix $\hat{H}_{M \times 2}$ of propagation channel estimates $\hat{h}_{11}$ to $\hat{h}_{M1}$ and $\hat{h}_{12}$ to $\hat{h}_{M2}$. In this regard, the propagation channel estimates $\hat{h}_{11}$ to $\hat{h}_{M1}$ and $\hat{h}_{12}$ to $\hat{h}_{M2}$ may be determined concurrently.

Figure 3B:
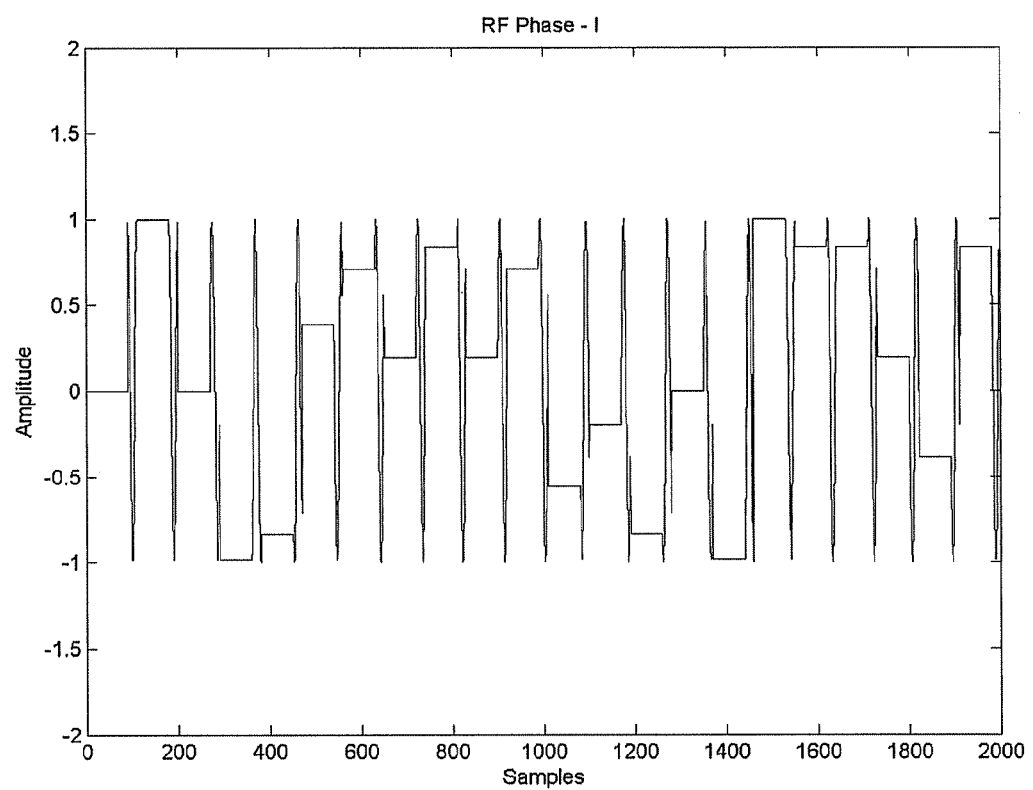
FIG. 3B illustrates an exemplary periodic phase rotation for an in-phase (I) signal received in one of the additional receive antennas, in accordance with an embodiment of the invention.

In step 316, the (M−1) maximum SNIR channel weights that comprise amplitude and phase components, $A_1$ to $A_{M-1}$ and $\phi_1$ to $\phi_{M-1}$, may be generated concurrently. The weight factors $W_1$ and/or $W_2$ in FIG. 2B may be generated concurrently with the (M−1) maximum SNIR channel weights. In some instances, the channel weights may be based on the propagation channel estimates determined after the weight factors $W_1$ and $W_2$ to the transmitter. In step 318, additional SC communication signals received may be phase and amplitude adjusted based on the maximum SNIR channel weights applied to the mixers 210 to 211. The channel estimation phase rotation and the maximum SINR phase/amplitude adjustment described in flow chart 300 may be performed continuously or may be performed periodically. In this regard, FIG. 3B illustrates an exemplary periodic phase rotation for an in-phase (I) signal received in one of the additional receive antennas, in accordance with an embodiment of the invention.

Figure 4A:
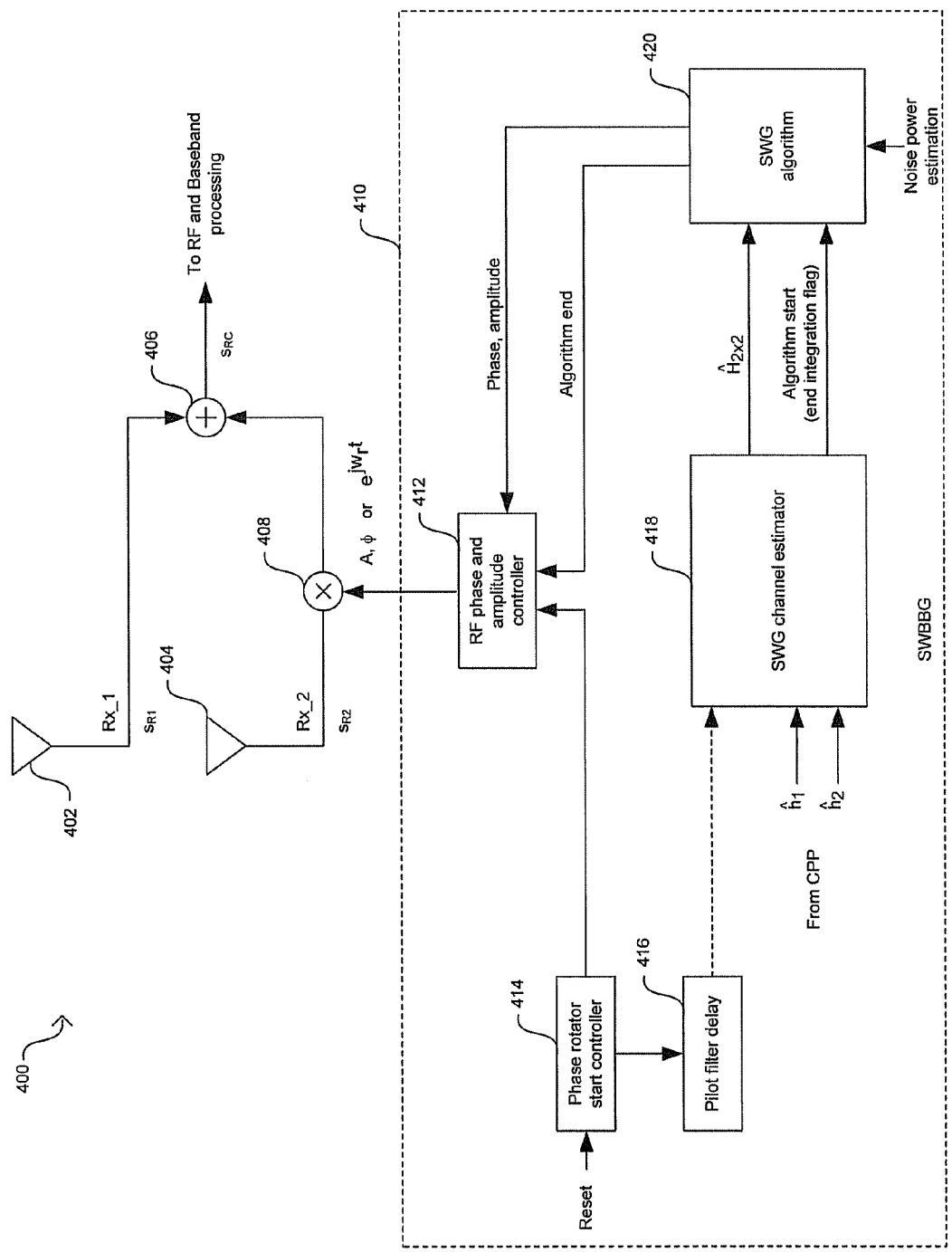
FIG. 4A is a block diagram of an exemplary single weight baseband generator (SWBBG) that may be utilized in a 2-Tx and 2-Rx antennas system, in accordance with an embodiment of the invention.

FIG. 4A is a block diagram of an exemplary single weight baseband generator (SWBBG) that may be utilized in a 2-Tx and 2-Rx antennas system, in accordance with an embodiment of the invention. Referring to FIG. 4A, a receiver system 400 may comprise a first receive antenna (Rx_1) 402, an additional receive antenna (Rx_2) 404, an adder 406, a mixer 408, and a single weight baseband generator (SWBBG) 410. The SWBBG 410 may comprise a phase rotator start controller 414, a delay block 416, a single weight generator (SWG) channel estimator 418, an SWG algorithm block 420, and an RF phase and amplitude controller 412. The SWBBG 410 may represent an exemplary implementation of the SWBBG 221 in FIG. 2B.

The first receive antenna, Rx_1 402, and the additional or second receive antenna, Rx_2 404, may comprise suitable hardware that may be adapted to receive at least a portion of transmitted SC communication signals in the receiver system 400. For example, the receive antenna Rx_1 402 may receive a signal $s_{R1}$ while the receive antenna Rx_2 404 may receive a signal $s_{R2}$. The mixer 408 may correspond to, for example, the mixer 210 in FIG. 2B. In some instances, the output of the mixer 308 may be communicated to a bandpass filter and/or a low noise amplifier (LNA) for further processing of the received signals.

The adder 406 may comprise suitable hardware, logic, and/or circuitry that may be adapted to add the output of the receive antenna Rx_1 402 and the output of the mixer 408 to generate a combined received SC communication signal, $s_{RC}$. In some instances, bringing the output signals of the receive antenna Rx_1 402 and the mixer 408 together into a single electrical connection may provide the functionality of the adder 406. The output of the adder 406 may be transferred to additional processing blocks for RF and baseband processing of the combined received SC communication signal, $s_{RC}$.

The phase rotator and start controller 414 may comprise suitable logic, circuitry, and/or code that may be adapted to control portions of the operation of the RF phase and amplitude controller 412 and to control the delay block 416. The phase rotator and start controller 414 may receive a signal, such as a reset signal, from, for example, the BB processor 220 in FIG. 2B, or from firmware operating in a processor, to indicate the start of operations that determine the propagation channel estimates and/or the channel weight to apply to the mixer 408. The delay block 416 may comprise suitable logic, circuitry, and/or code that may be adapted to provide a time delay to compensate for the RF/modem delay. The delay may be applied in order to compensate for the interval of time that may occur between receiving the combined channel estimates, $\hat{h}_1$ and $\hat{h}_2$, modified by the rotation waveform and the actual rotating waveform at the mixer 408.

The SWG channel estimator 418 may comprise suitable logic, circuitry, and/or code that may be adapted to process the first and second baseband combined channel estimates, $\hat{h}_1$ and $\hat{h}_2$, and determine the matrix $\hat{H}_{2\times2}$ of propagation channel estimates $\hat{h}_{11}$, $\hat{h}_{12}$, $\hat{h}_{21}$, and $\hat{h}_{22}$. The SWG channel estimator 418 may also be adapted to generate an algorithm start signal to the SWG algorithm block 420 to indicate that the propagation channel estimates $\hat{h}_{11}$, $\hat{h}_{12}$, $\hat{h}_{21}$, and $\hat{h}_{22}$ are available for processing. In this regard, the algorithm start signal may be asserted when integration operations performed by the SWG channel estimator 418 have completed.

The SWG algorithm block 420 may comprise suitable logic, circuitry, and/or code that may be adapted to determine a channel weight to be transferred to the mixer 408 via the RF phase and amplitude controller 412 to modify the signal $s_{R2}$. The channel weight to be transferred to the mixer 408 may refer to the phase, $\phi$, and amplitude, A. The channel weight may be based on the propagation channel estimates $\hat{h}_{11}$, $\hat{h}_{12}$, $\hat{h}_{21}$, and $\hat{h}_{22}$ and on additional information such as noise power estimates and interference propagation channel estimates, for example. The SWG algorithm block 420 may also be adapted to generate an algorithm end signal to indicate to the RF phase and amplitude controller 412 that the channel weight has been determined and that it may be applied to the mixer 408. The SWG algorithm block 420 in FIG. 4A may also be adapted to determine the weight factors $W_1$ and $W_2$. The channel weights and the weight factors $W_1$ and $W_2$ may be calculated jointly to maximize the receiver SINR, for example.

The RF phase and amplitude controller 412 may comprise suitable logic, circuitry, and/or code that may be adapted to apply the rotation waveform $e^{jw_r t}$ to the mixer 408. When phase and amplitude components, A and $\phi$, that correspond to the channel weight determined by the SWG algorithm block 420 are available, the RF phase and amplitude controller 412 may apply amplitude A and phase $\phi$ to the mixer 408. In this regard, the RF phase and amplitude controller 412 may apply the rotation waveform or the amplitude and phase components in accordance with the control signals provided by the phase rotator start controller 414 and/or the algorithm end signal generated by the SWG algorithm block 420.

The phase rotation operation performed on the $s_{R2}$ signal in the additional receive antenna Rx_2 404 may be continuous or periodic. A continuous rotation of the $s_{R2}$ signal may be perceived by a wireless modem as a high Doppler, and for some modem implementations this may decrease the modem's performance. When a periodic rotation operation is utilized instead, the period between consecutive phase rotations may depend on the Doppler frequency perceived by the wireless modem. For example, in a higher Doppler operation, it may be necessary to perform more frequent channel estimation while in a lower Doppler operation, channel estimation may be less frequent. The signal rotation period may also depend on the desired wireless modem performance and the accuracy of the propagation channel estimation. For example, when the Doppler frequency is 5 Hz, the period between consecutive rotations may be 1/50 sec., that is, 10 rotations or channel estimations per signal fade.

Figure 4B:
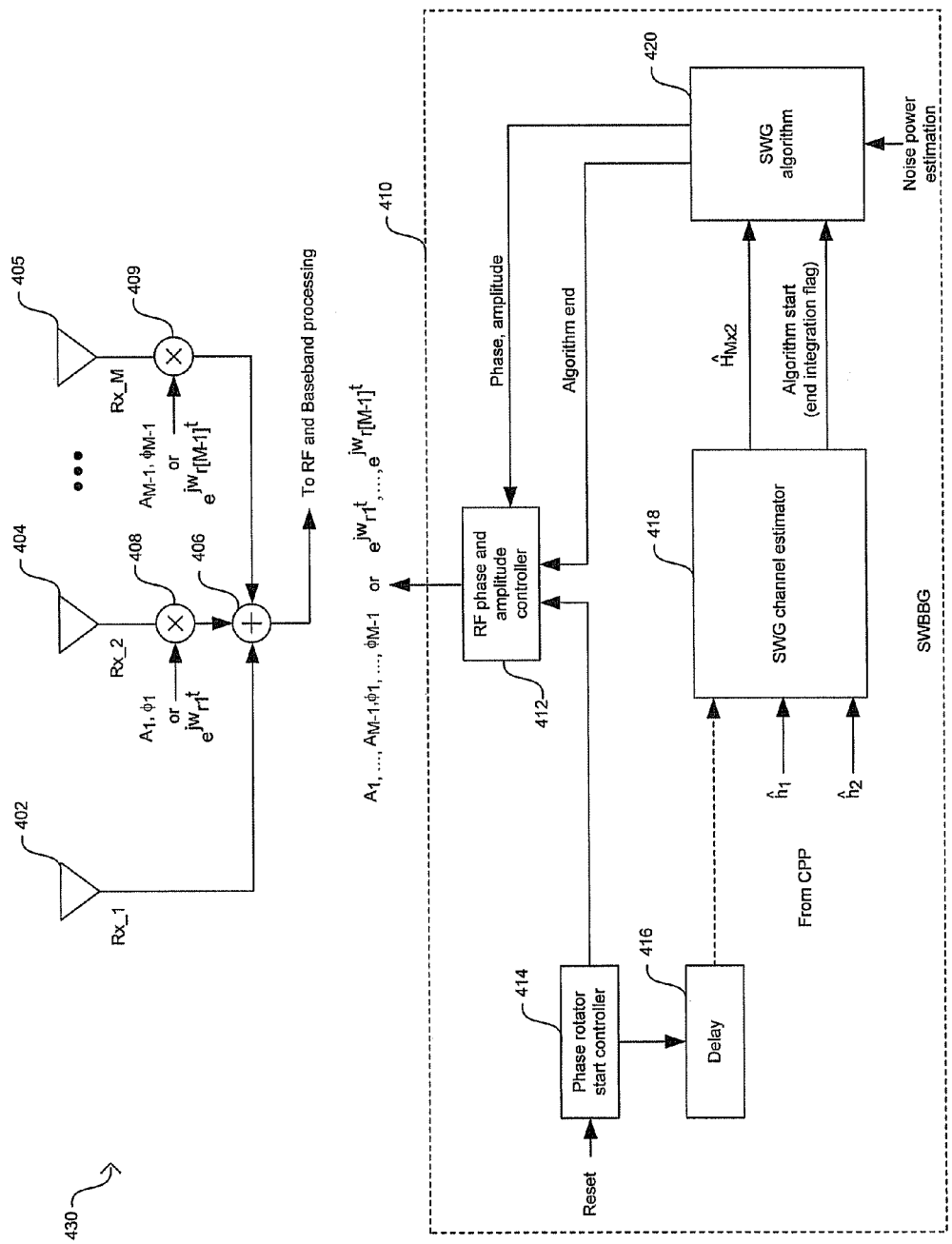
FIG. 4B is a block diagram of an exemplary single weight baseband generator (SWBBG) that may be utilized in a 2-Tx and M-Rx antennas system, in accordance with an embodiment of the invention.

FIG. 4B is a block diagram of an exemplary single weight baseband generator (SWBBG) that may be utilized in a 2-Tx and M-Rx antennas system, in accordance with an embodiment of the invention. Referring to FIG. 4B, a receiver system 430 may differ from the receiver system 400 in FIG. 4A in that (M−1) additional receive antennas, Rx_2 404 to Rx_M 405, and (M−1) mixers 408 to 409 may be utilized. In this regard, the SWG channel estimator 418 may be adapted to process the first and second baseband combined channel estimates, $\hat{h}_1$ and $\hat{h}_2$, and determine the matrix $\hat{H}_{M\times 2}$ of propagation channel estimates $\hat{h}_{11}$ to $\hat{h}_{M1}$ and $\hat{h}_{12}$ to $\hat{h}_{M2}$.

The SWG algorithm block 420 may also be adapted to determine (M−1) channel weights, that may be utilized to maximize receiver SINR, for example, to be applied to the mixers 408 to 409 to modify the portions of the transmitted SC communication signals received by the additional receive antennas Rx_2 404 to Rx_M 405. The (M−1) channel weights may comprise amplitude and phase components, $A_1$ to $A_{M-1}$ and $\phi_1$ to $\phi_{M-1}$. The SWG algorithm block 420 in FIG. 4B may also be adapted to determine the weight factors $W_1$ and $W_2$ that may be applied to the mixers 230 and 232 in FIG. 2B. The channel weights and the weight factors $W_1$ and $W_2$ may be calculated jointly to maximize the receiver SINR, for example.

The RF phase and amplitude controller 412 may also be adapted to apply rotation waveforms $e^{jw_{r1}t}$ to $e^{jw_{r(M-1)}t}$ or phase and amplitude components, $A_1$ to $A_{M-1}$ and $\phi_1$ to $\phi_{M-1}$, to the mixers 408 to 409. In this regard, the RF phase and amplitude controller 312 may apply the rotation waveforms or the amplitude and phase components in accordance with the control signals provided by the phase rotator start controller 414 and/or the algorithm end signal generated by the SWG algorithm block 420.

Figure 4C:
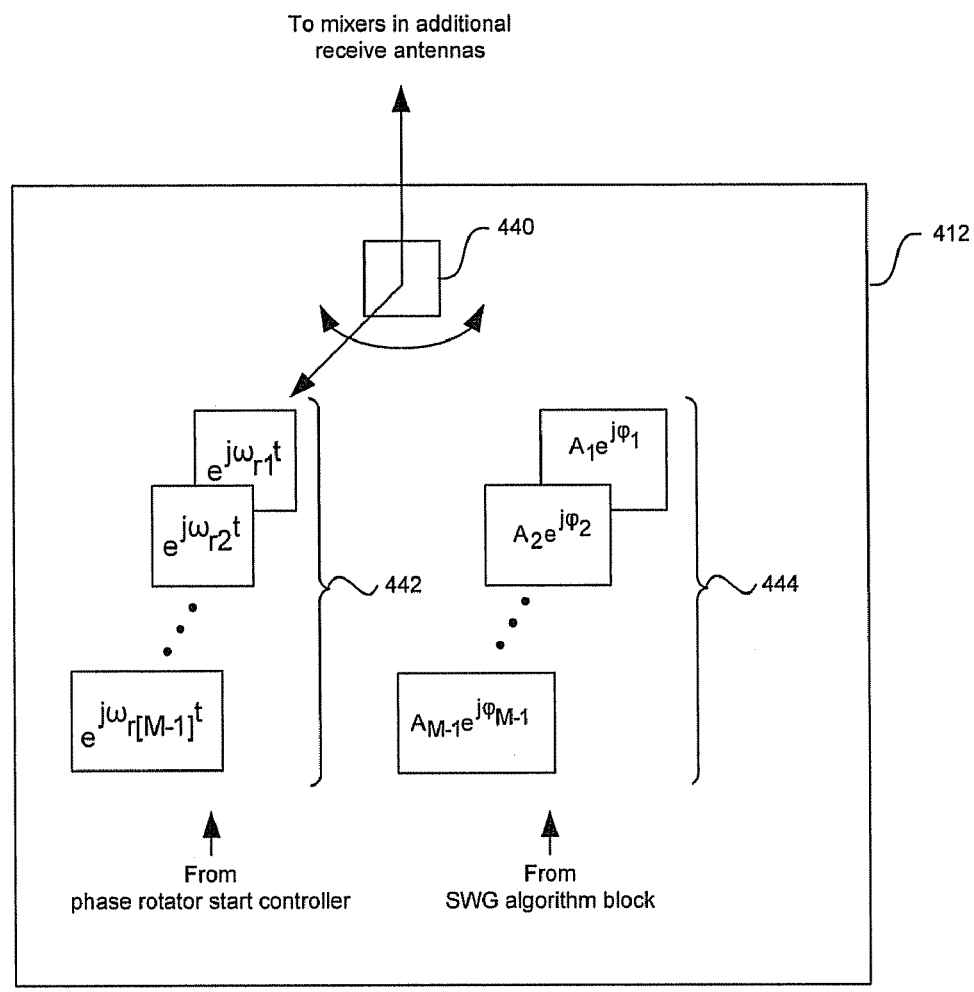
FIG. 4C is a block diagram of an exemplary RF phase and amplitude controller, in accordance with an embodiment of the invention.

FIG. 4C is a block diagram of an exemplary RF phase and amplitude controller, in accordance with an embodiment of the invention. Referring to FIG. 4C, the RF phase and amplitude controller 412 may comprise a switch 440, a plurality of rotation waveform sources 442, and a plurality of SWG algorithm weights 444. The switch 440 may comprise suitable hardware, logic, and/or circuitry that may be adapted to select between the rotation waveforms $e^{jw_{r1}t}$ to $e^{jw_{r(M-1)}t}$ and the SWG algorithm determined weights $A_1 e^{j\phi_1}$ to $A_{M-1} e^{j\phi_{M-1}}$. The rotation waveform sources 442 may comprise suitable hardware, logic and/or circuitry that may be adapted to generate the signal $e^{jw_{rk}t}$, where $w_{rk}=2\pi f_{rk}$ and $f_{rk}$ is the rotation frequency that preserves the orthogonality of the received signals at the receive antennas Rx_2 402 to Rx_M 405 in FIG. 4B, for example. The rotation frequency that preserves the signal orthogonality at the receiving antennas may be selected as $w_{rk}=kw_r$ where k=1, 2, . . . , M−1. Other rotation waveforms such as triangular or square waveforms may be utilized with the same frequency relationships. Moreover, waveforms representing different orthogonal codes of the same frequency may also be utilized, similar to the CDMA orthogonal codes with the same spreading. In this embodiment, the signal $e^{jw_{rk}t}$ may be utilized as an exemplary waveform. The plurality of SWG algorithm weights 344 may comprise suitable hardware, logic, and/or circuitry that may be adapted to generate the signals $A_1 e^{j\phi_1}$ to $A_{M-1}e^{j\phi_{M-1}}$ from the amplitude and phase components, $A_1$ to $A_{M-1}$ and $\phi_1$ to $\phi_{M-1}$, respectively.

In operation, the RF phase and amplitude controller 412 may apply the signals $e^{jw_{r1}t}$ to $e^{jw_{r(M-1)}t}$ to the mixers 408 to 409 in FIG. 4B based on control information provided by the phase rotator start controller 414. The switch 440 may select the rotation waveform sources 442 based on the control information provided by the phase rotator start controller 414. Once the channel weights are determined by the SWG algorithm block 420 and the phase and amplitude components have been transferred to the RF phase and amplitude controller 412, the algorithm end signal may be utilized to change the selection of the switch 440. In this regard, the switch 440 may be utilized to select and apply the signals $A_1 e^{j\phi_1}$ to $A_{M-1}e^{j\phi_{M-1}}$ to the mixers 408 to 409 in FIG. 4B.

Figure 5:
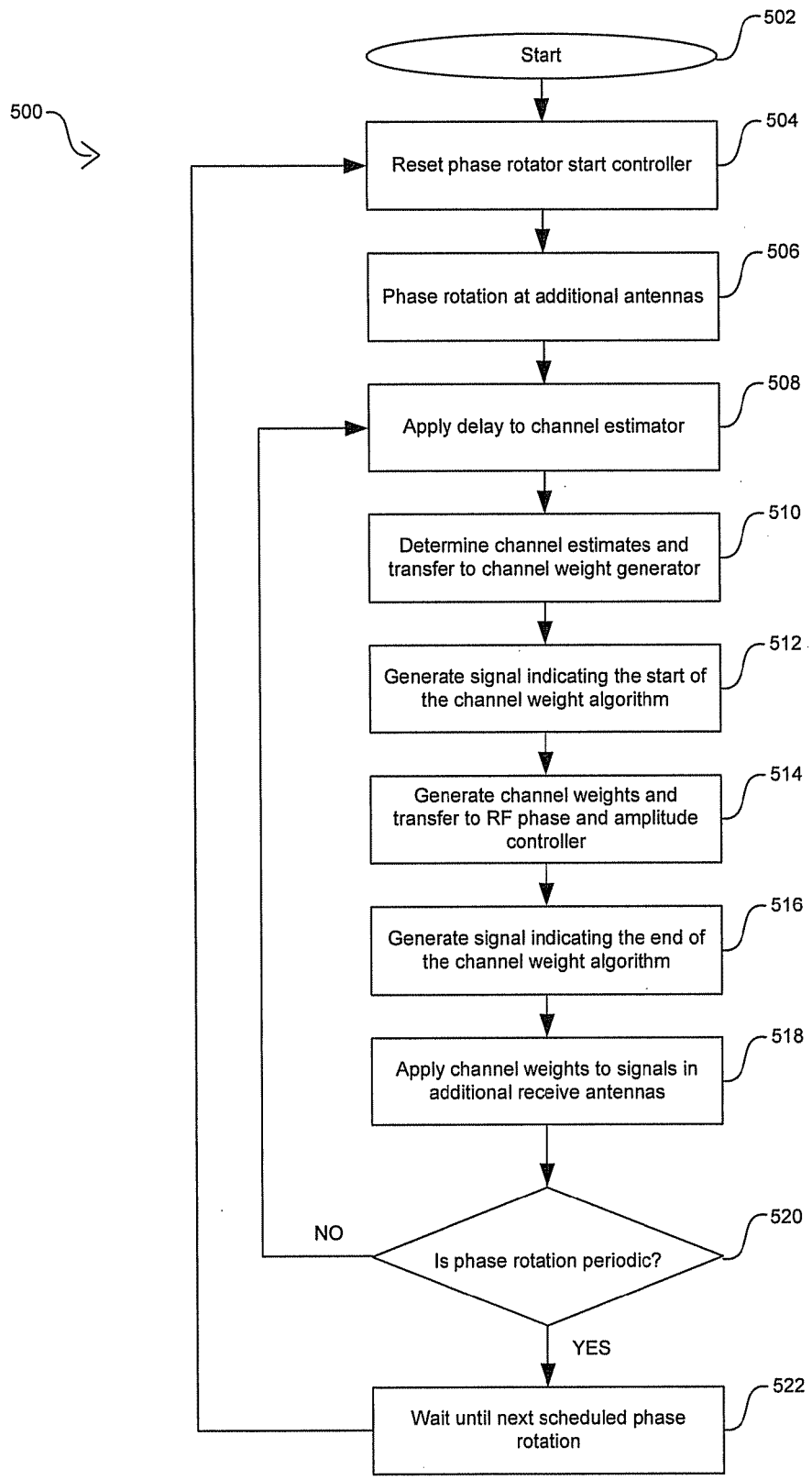
FIG. 5 is a flow diagram illustrating exemplary steps in the operation of the single weight baseband generator (SWBBG) that may be utilized for channel estimation in a 2-Tx and M-Rx antennas system, in accordance with an embodiment of the invention.

FIG. 5 is a flow diagram illustrating exemplary steps in the operation of the single weight baseband generator (SWBBG) that may be utilized for channel weight generation in a 2-Tx and M-Rx antennas system, in accordance with an embodiment of the invention. Referring to FIG. 5, after start step 502, in step 504, the phase rotator start controller 414 in FIG. 4B may receive the reset signal to initiate operations for determining propagation channel estimates and channel weights in the SWBBG 410. The phase rotator start controller 414 may generate control signals to the delay block 416 and to the RF phase and amplitude controller 412. The control signals to the delay block 416 may be utilized to determine a delay time to be applied by the delay block 416. The control signals to the RF phase and amplitude controller 412 may be utilized to determine when to apply the rotation waveforms that have been modified by the channel weights to the mixers 408 to 409.

In step 506, the RF phase and amplitude controller 412 may apply rotation waveforms, such as those provided by the rotation waveform sources 442 in FIG. 4C, to the mixers 408 to 409 in FIG. 4B. In step 508, the delay block 416 may apply a time delay signal to the SWG channel estimator 418 to reflect the interval of time that may occur between receiving the SC communication signals and when the first and second baseband combined channel estimates, $\hat{h}_1$ and $\hat{h}_2$, are available to the SWG channel estimator 418. For example, the time delay signal may be utilized as an enable signal to the SWG channel estimator 418, where the assertion of the time delay signal initiates operations for determining propagation channel estimates. In step 510, the SWG channel estimator 418 may process the first and second baseband combined channel estimates, $\hat{h}_1$ and $\hat{h}_2$, and may determine the matrix $\hat{H}_{Mx2}$ of propagation channel estimates $\hat{h}_{11}$ to $\hat{h}_{M1}$ and $\hat{h}_{12}$ to $\hat{h}_{M2}$. The SWG channel estimator 418 may transfer the propagation channel estimates $\hat{h}_{11}$ to $\hat{h}_{M1}$ and $\hat{h}_{12}$ to $\hat{h}_{M2}$ to the SWG algorithm block 420. In step 512, the SWG channel estimator 418 may generate the algorithm start signal and may assert the signal to indicate to the SWG algorithm block 420 that it may initiate operations for determining channel weights.

In step 514, the SWG algorithm block 420 may determine the channel weights comprising phase and amplitude components, $A_1$ to $A_{M-1}$ and $\phi_1$ to $\phi_{M-1}$, based on the propagation channel estimates $\hat{h}_{11}$ to $\hat{h}_{M1}$ and $\hat{h}_{12}$ to $\hat{h}_{M2}$ and/or noise power estimates, for example. The SWG algorithm block 420 may transfer the channel weights to the RF phase and amplitude controller 412. In some instances, the SWG algorithm block 420 may also generate the weight factors $W_1$ and/or $W_2$. In step 516, the SWG algorithm block 420 may generate the algorithm end signal to indicate to the RF phase and amplitude controller 412 that the channel weights are available to be applied to the mixers 408 to 409. In step 518, the RF phase and amplitude controller 412 may apply the rotation waveforms with phase and amplitude components, $A_1$ to $A_{M-1}$ and $\phi_1$ to $\phi_{M-1}$, to the mixers 408 to 409, in accordance with the control signals provided by the phase rotator start controller 414.

In step 520, the receiver system 430 in FIG. 4B may determine whether the phase rotation operation on the received SC communication signals is periodic. When the phase rotation operation is not periodic but continuous, the process may proceed to step 508 where a delay may be applied to the SWG channel estimator 418. In instances when the phase rotation operation is periodic, the process may proceed to step 522 where the receiver system 430 may wait until the next phase rotation operation is initiated by the reset signal. In this regard, the process control may proceed to step 504 upon assertion of the reset signal to the phase rotator start controller 414.

Figure 6:
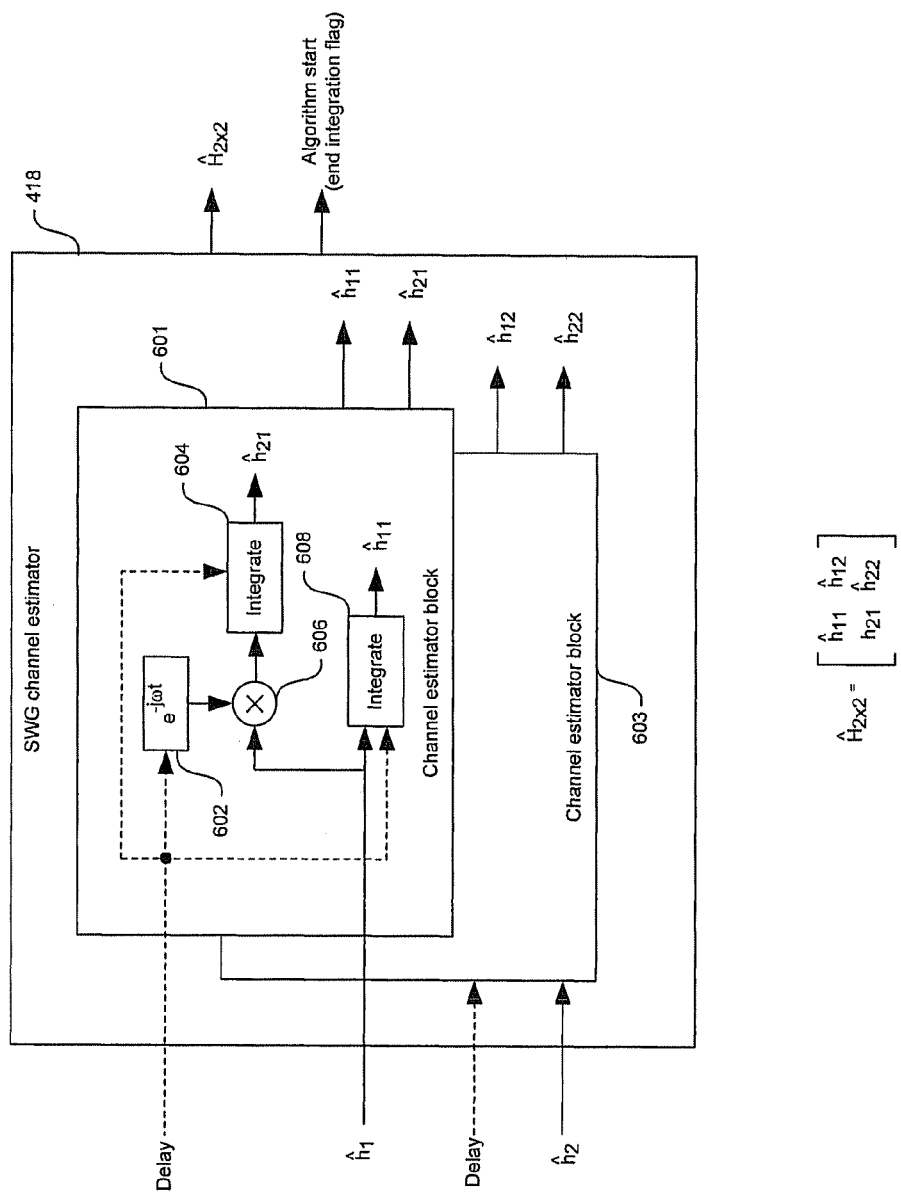
FIG. 6 is a block diagram of an exemplary channel estimator for a 2-Tx and 2-Rx antennas system, in accordance with an embodiment of the invention.

FIG. 6 is a block diagram of an exemplary channel estimator for a 2-Tx and 2-Rx antennas system, in accordance with an embodiment of the invention. Referring to FIG. 6, the SWG channel estimator 418 in FIG. 4A utilized in, for example, a 2-Tx and 2-Rx antenna system may comprise a first channel estimator block 601 and a second channel estimator block 603. The first channel estimator block 601 may comprise a phase rotator 602, a mixer 606, a first integrator 604, and a second integrator 608. The second channel estimator block 603 may also comprise a phase rotator 602, a mixer 606, a first integrator 604, and a second integrator 608. The phase rotator 602 may comprise suitable logic, circuitry, and/or code that may be adapted to generate a complex conjugate of the rotation waveform $e^{jw_r t}$. The first integrator 604 and the second integrator 608 may comprise suitable logic, circuitry, and/or code that may be adapted to integrate an input signal over a 360-degree phase rotation period.

The accuracy and/or time of the integration may vary and may be selected by the SWGGB 410 in FIG. 4A. The mixer 606 may comprise suitable logic and/or circuitry that may be adapted to multiply the rotation waveform complex conjugate and a baseband combined channel estimate. For example, the mixer 606 in the first channel estimator block 601 and the mixer 606 in the second channel estimator block 603 may multiply, respectively, the first and second baseband combined channel estimates, $\hat{h}_1$ and $\hat{h}_2$, where $\hat{h}_1 = \hat{h}_{11} + e^{jw_r t}\hat{h}_{21}$ and $\hat{h}_2 = \hat{h}_{12} + e^{jw_r t}\hat{h}_{22}$, with the rotation waveform complex conjugate.

In operation, the delay signal from the delay block 416 may indicate to the phase rotator 602, the first integrator 604, and/or the second integrator 608 when to start operations for determining the propagation channel estimates. After the delay signal is asserted, the second integrator 608 may receive the baseband combined channel estimate and may integrate the baseband combined channel estimate over a 360-degree phase rotation period. The integration time may be selected based on channel estimation accuracy and required modem performance. A longer integration time may result in more accurate channel estimates. The second integrator 608 in the first channel estimator block 601 and the second integrator 608 in the second channel estimator block 603 may determine, respectively, the propagation channel estimates $\hat{h}_{11}$ and $\hat{h}_{12}$ by determining the expectation values of $\hat{h}_1$ and $\hat{h}_2$ as follows:

$$\hat{h}_{11}=E[\hat{h}_{11}+e^{jw_rt}\hat{h}_{21}]=\hat{h}_{11}+E[e^{jw_rt}\hat{h}_{21}], \text{ and}$$

$$\hat{h}_{12}=E[\hat{h}_{12}+e^{jw_rt}\hat{h}_{22}]=\hat{h}_{12}+E[e^{jw_rt}\hat{h}_{22}],$$

where $E[e^{jw_rt}\hat{h}_{21}]$ and $E[e^{jw_rt}\hat{h}_{22}]$ over a full 360-degree rotation period are equal to zero. In this regard, channel estimates $\hat{h}_{11}$ and $\hat{h}_{12}$ may referred to as first channel estimates because they correspond to propagation channels related to a first transmit antenna.

After the delay signal is asserted, the first integrator 604 in the first channel estimator block 601 and the first integrator 604 in the second channel estimator block 603 may receive, respectively, the signals $e^{-jw_rt}\hat{h}_1$ and $e^{-jw_rt}\hat{h}_2$. The first integrator 604 in the first channel estimator block 601 and the first integrator 604 in the second channel estimator block 603 may determine, respectively, the channel estimates $\hat{h}_{21}$ and $\hat{h}_{22}$ by determining the expectation values of $e^{-jw_rt}\hat{h}_1$ and $e^{-jw_rt}\hat{h}_2$ as follows:

$$\hat{h}_{21}=E[e^{-jw_rt}\hat{h}_1]=E[e^{-jw_rt}(\hat{h}_{11}+e^{jw_rt}\hat{h}_{21})]=E[e^{-jw_rt}\hat{h}_{11}+\hat{h}_{21}]=E[e^{-jw_rt}\hat{h}_{11}]+\hat{h}_{21},$$

and $$\hat{h}_{22}=E[e^{-jw_rt}\hat{h}_2]=E[e^{-jw_rt}(\hat{h}_{12}+e^{jw_rt}\hat{h}_{22})]=E[e^{-jw_rt}\hat{h}_{12}+\hat{h}_{22}]=E[e^{-jw_rt}\hat{h}_{12}]+\hat{h}_{22}$$

where $E[e^{-jw_rt}\hat{h}_{11}]$ and $E[e^{-jw_rt}\hat{h}_{12}]$ over a full 360-degree rotation period is equal to zero. In this regard, channel estimates $\hat{h}_{21}$ and $\hat{h}_{22}$ may referred to as second channel estimates because they correspond to propagation channels related to a second transmit antenna.

The channel estimation operations performed by the SWG channel estimator 418 may be extended to cases where M receive antennas result in a first and second baseband combined channel estimates, $\hat{h}_1$ and $\hat{h}_2$, which comprise information regarding propagation channels $h_{11}$ to $h_{M1}$ and $h_{12}$ to $h_{M2}$. In that case, a plurality of channel estimator blocks may be utilized to determine the matrix $\hat{H}_{M\times 2}$ of propagation channel estimates $\hat{h}_{11}$ to $\hat{h}_{M1}$ and $\hat{h}_{12}$ to $\hat{h}_{M2}$.

Figure 7:
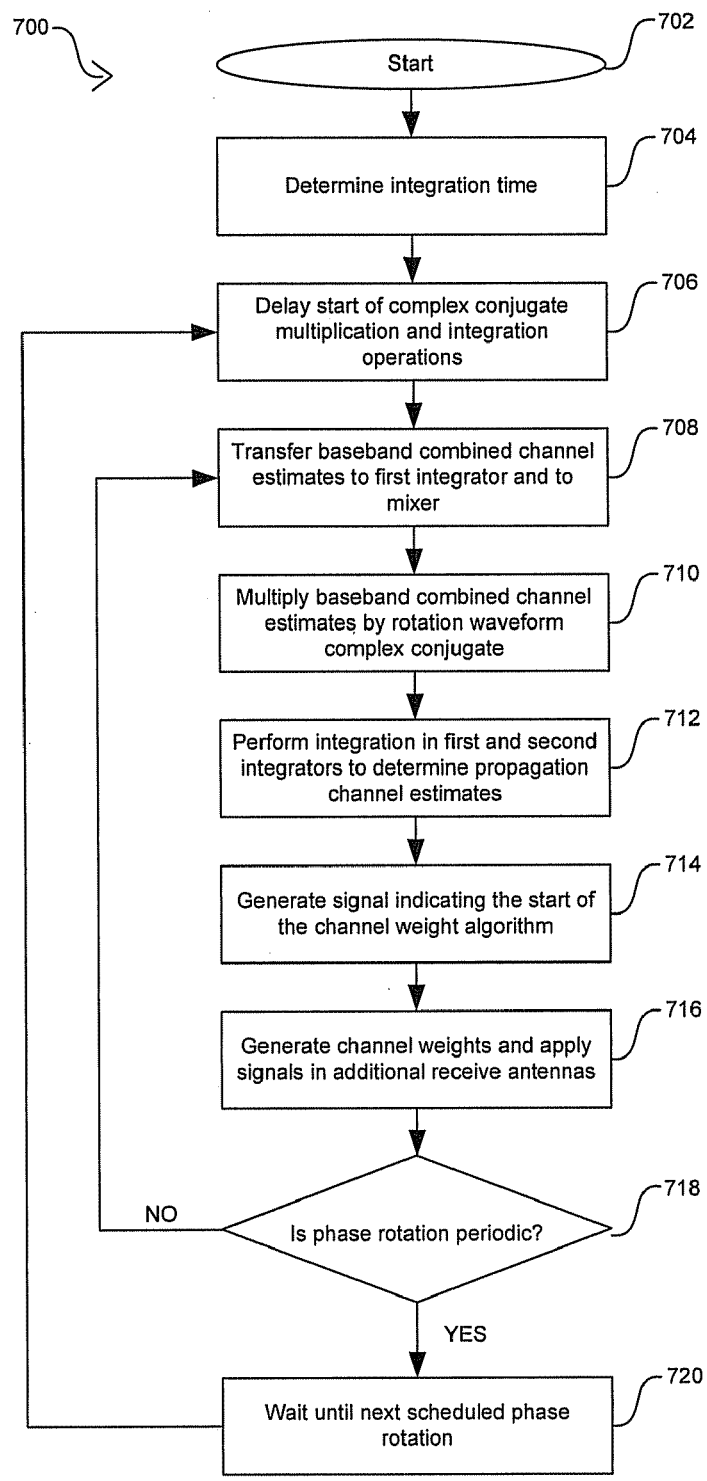
FIG. 7 is a flow diagram illustrating exemplary steps for channel estimation based on complex multiplication and integration of a first and second baseband combined channel estimates, in accordance with an embodiment of the invention.

FIG. 7 is a flow diagram illustrating exemplary steps for channel estimation based on complex multiplication and integration of a first and second baseband combined channel estimates, in accordance with an embodiment of the invention. Referring to FIG. 7, after start step 702, in step 704, the integration time and/or integration resolution may be selected for the first and second integrators in FIG. 6. For example, the SWBBG 221 in FIG. 2A may select the integration time. In step 706, the delay signal may be asserted to initiate the operations performed by the phase rotator 602, the first integrator 604, and the second integrator 608. The phase rotator 602 may generate a complex conjugate of the rotation waveform $e^{jw_rt}$. In step 708, the first and second baseband combined channel estimates, $\hat{h}_1$ and $\hat{h}_2$, may be transferred to the second integrator 608 and to the mixer 606 for processing. In step 710, the baseband combined channel estimates, $\hat{h}_1$ and $\hat{h}_2$, may be multiplied by the complex conjugate of the rotation waveform $e^{jw_rt}$.

In step 712, integration over a 360-degree phase rotation period may be performed in the first integrator 604 and the second integrator 608 to determine propagation channel estimates $\hat{h}_{21}$ and $\hat{h}_{22}$ and $\hat{h}_{11}$ and $\hat{h}_{12}$ respectively. In step 714, after the propagation channel estimates have been determined, the SWG channel estimator 418 in FIG. 4A may generate the algorithm start signal to indicate to the SWG algorithm block 420 that the propagation channel estimates are available. The SWG algorithm block 420 may start operations for determining channel weights when the algorithm start signal is asserted. In step 716, the SWG algorithm block 420 may generate channel weights based on the propagation channel estimates. The channel weights may be applied to the additional or second receive antenna.

In step 718, the receiver system 400 in FIG. 4A may determine whether the phase rotation operation on the received SC communication signals is periodic. When the phase rotation is not periodic but continuous, control may proceed to step 708 where the next set of first and second baseband combined channel estimates, $\hat{h}_1$ and $\hat{h}_2$, from the CPP 218 in FIG. 2A may be available for channel estimation. When the phase rotation is periodic, control may proceed to step 720 where the SWG channel estimator 418 may wait until the delay signal is asserted to initiate the operations performed by the phase rotator 602, the first integrator 604, and the second integrator 608. In this regard, control may proceed to step 706 upon the assertion of the reset signal to the phase rotator start controller 414 and the generation of the control signals to the delay block 416.

The channel estimation operations described in FIG. 7 may be extended to cases where M receive antennas result in a first and second baseband combined channel estimates, $\hat{h}_1$ and $\hat{h}_2$, which comprise information regarding propagation channels $h_{11}$ to $h_{M1}$ and $h_{12}$ to $h_{M2}$. In that case, a plurality of channel estimator blocks may be utilized to determine the matrix $\hat{H}_{M\times 2}$ of propagation channel estimates $\hat{h}_{11}$ to $\hat{h}_{M1}$ and $\hat{h}_{12}$ to $\hat{h}_{M2}$.

In an embodiment of the invention, a machine-readable storage may be provided, having stored thereon, a computer program having at least one code section executable by a machine, thereby causing the machine to perform the steps for achieving channel estimation in a SC MIMO system comprising 2-Tx and M-Rx antennas for WCDMA/HSDPA.

The method and system for channel estimation in a single channel (SC) multiple-input multiple-output (MIMO) system described herein allows for a fast and cost effective approach to concurrently determine propagation channel estimates in a two-transmit (2-Tx) and multiple-receive (M-Rx) antennas wireless communication system for WCDMA/HSDPA.

Accordingly, the present invention may be realized in hardware, software, or a combination of hardware and software. The present invention may be realized in a centralized fashion in at least one computer system, or in a distributed fashion where different elements are spread across several interconnected computer systems. Any kind of computer system or other apparatus adapted for carrying out the methods described herein is suited. A typical combination of hardware and software may be a general-purpose computer system with a computer program that, when being loaded and executed, controls the computer system such that it carries out the methods described herein.

The present invention may also be embedded in a computer program product, which comprises all the features enabling the implementation of the methods described herein, and which when loaded in a computer system is able to carry out these methods. Computer program in the present context means any expression, in any language, code or notation, of a set of instructions intended to cause a system having an information processing capability to perform a particular function either directly or after either or both of the following: a) conversion to another language, code or notation; b) reproduction in a different material form.

While the present invention has been described with reference to certain embodiments, it will be understood by those skilled in the art that various changes may be made and equivalents may be substituted without departing from the scope of the present invention. In addition, many modifications may be made to adapt a particular situation or material to the teachings of the present invention without departing from its scope. Therefore, it is intended that the present invention not be limited to the particular embodiment disclosed, but that the present invention will include all embodiments falling within the scope of the appended claims.

What is claimed is:

1. A method for communication, the method comprising:
generating a plurality of channel estimates for a plurality of received single channel communication signals based on a first baseband combined channel estimate and a second baseband combined channel estimate;
determining based on said plurality of channel estimates, a plurality of channel weights to be utilized for modifying a rotation waveform; and
modifying based on said determined plurality of channel weights, said plurality of received single channel communication signals to achieve channel orthogonality.

2. The method according to claim 1, comprising receiving said plurality of single channel communication signals by utilizing a first antenna and one or more other antennas.

3. The method according to claim 1, wherein said modifying comprises modifying said plurality of said received single channel communication signals based on said modified rotation waveform.

4. The method according to claim 1, wherein said modifying comprises multiplying said plurality of said received single channel communication signals by said rotation waveform.

5. The method according to claim 4, comprising combining said plurality of said received single channel communication signals that are received utilizing a first antenna and said multiplied plurality of said received single channel communication signals that are received utilizing one or more other antennas.

6. The method according to claim 1, comprising determining at least a first channel estimate of said plurality of channel estimates by integrating said first baseband combined channel estimate and said second baseband combined channel estimate over a 360-degree rotation period.

7. The method according to claim 1, comprising multiplying said first baseband combined channel estimate and said second baseband combined channel estimate by a complex conjugate of said rotation waveform.

8. The method according to claim 7, comprising determining at least a second channel estimate of said plurality of channel estimates by integrating said multiplied first baseband combined channel estimate and said multiplied second baseband combined channel estimate over a 360-degree rotation period.

9. The method according to claim 1, wherein said plurality of channel weights include a phase component and an amplitude component.

10. The method according to claim 9, wherein said phase component and said amplitude component result in a maximum signal-to-interference-and-noise ratio (SINR).

11. The method according to claim 1, further comprising determining a plurality of channel weight factors based on said plurality of channel estimates.

12. A system for communication, the system comprising:
one or more circuits that are configured to:
generate a plurality of channel estimates for a plurality of received single channel communication signals based on a first baseband combined channel estimate and a second baseband combined channel estimate;
determine based on said plurality of channel estimates, a plurality of channel weights to be utilized for modifying a rotation waveform; and
modify based on said determined plurality of channel weights, said plurality of received single channel communication signals to achieve channel orthogonality.

13. The system according to claim 12, wherein said one or more circuits are configured to receive said plurality of single channel communication signals by utilizing a first antenna and one or more other antennas.

14. The system according to claim 12, wherein said one or more circuits are configured to modify said plurality of said received single channel communication signals based on said modified rotation waveform.

15. The system according to claim 12, wherein said one or more circuits are configured to multiply said plurality of said received single channel communication signals by said rotation waveform.

16. The system according to claim 15, wherein said one or more circuits are configured to combine said plurality of said received single channel communication signals that are received utilizing a first antenna and said multiplied plurality of said received single channel communication signals that are received utilizing one or more other antennas.

17. The system according to claim 12, wherein said one or more circuits are configured to determine at least a first channel estimate of said plurality of channel estimates by integrating said first baseband combined channel estimate and said second baseband combined channel estimate over a 360-degree rotation period.

18. The system according to claim 12, wherein said one or more circuits are configured to multiply said first baseband combined channel estimate and said second baseband combined channel estimate by a complex conjugate of said rotation waveform.

19. The system according to claim 18, wherein said one or more circuits are configured to determine at least a second channel estimate of said plurality of channel estimates by integrating said multiplied first baseband combined channel estimate and said multiplied second baseband combined channel estimate over a 360-degree rotation period.

20. A machine-readable storage having stored thereon, a computer program having at least one code section for communication, the at least one code section being executable by a machine for causing the machine to perform steps comprising:
generating a plurality of channel estimates for a plurality of received single channel communication signals based on a first baseband combined channel estimate and a second baseband combined channel estimate;
determining based on said plurality of channel estimates, a plurality of channel weights to be utilized for modifying a rotation waveform; and
modifying based on said determined plurality of channel weights, said plurality of received single channel communication signals to achieve channel orthogonality.

21. The machine-readable storage according to claim 20, wherein said at least one code section comprises code for receiving said plurality of single channel communication signals by utilizing a first antenna and one or more other antennas.

22. The machine-readable storage according to claim 20, wherein said modifying comprises modifying said plurality of said received single channel communication signals based on said modified rotation waveform.

23. The machine-readable storage according to claim 20, wherein said modifying comprises multiplying said plurality of said received single channel communication signals by said rotation waveform.

24. The machine-readable storage according to claim 23, wherein said at least one code section comprises code for combining said plurality of said received single channel communication signals that are received utilizing a first antenna and said multiplied plurality of said received single channel communication signals that are received utilizing one or more other antennas.

25. The machine-readable storage according to claim 20, wherein said at least one code section comprises code for determining at least a first channel estimate of said plurality of channel estimates by integrating said first baseband combined channel estimate and said second baseband combined channel estimate over a 360-degree rotation period.

26. The machine-readable storage according to claim 20, wherein said at least one code section comprises code for multiplying said first baseband combined channel estimate and said second baseband combined channel estimate by a complex conjugate of said rotation waveform.

27. The machine-readable storage according to claim 26, wherein said at least one code section comprises code for determining at least a second channel estimate of said plurality of channel estimates by integrating said multiplied first baseband combined channel estimate and said multiplied second baseband combined channel estimate over a 360-degree rotation period.

* * * * *